(12) United States Patent  (10) Patent No.: US 9,139,363 B2
Lert  (45) Date of Patent: Sep. 22, 2015

(54) AUTOMATED SYSTEM FOR TRANSPORTING PAYLOADS

(71) Applicant: John Lert, Wakefield, MA (US)

(72) Inventor: John Lert, Wakefield, MA (US)

( * ) Notice: Subject to any disclaimer, the term of this patent is extended or adjusted under 35 U.S.C. 154(b) by 0 days.

(21) Appl. No.: 14/213,187

(22) Filed: Mar. 14, 2014

(65) Prior Publication Data

US 2014/0288696 A1  Sep. 25, 2014

Related U.S. Application Data

(60) Provisional application No. 61/794,023, filed on Mar. 15, 2013.

(51) Int. Cl.
*G06F 7/00* (2006.01)
*B65G 1/137* (2006.01)
*B65G 1/04* (2006.01)

(52) U.S. Cl.
CPC ............ *B65G 1/1378* (2013.01); *B65G 1/0492* (2013.01)

(58) Field of Classification Search
USPC .......................................................... 700/216
See application file for complete search history.

(56) References Cited

U.S. PATENT DOCUMENTS

| | | | |
|---|---|---|---|
| 7,591,630 B2 | 9/2009 | Lert, Jr. | |
| 7,991,505 B2 | 8/2011 | Lert, Jr. et al. | |
| 8,425,173 B2 | 4/2013 | Lert et al. | |
| 8,594,835 B2 | 11/2013 | Lert et al. | |
| 2009/0074545 A1* | 3/2009 | Lert et al. | 414/276 |
| 2010/0076591 A1 | 3/2010 | Lert, Jr. | |
| 2010/0316468 A1 | 12/2010 | Lert et al. | |
| 2010/0322746 A1 | 12/2010 | Lert et al. | |
| 2010/0322747 A1 | 12/2010 | Lert et al. | |
| 2012/0101627 A1 | 4/2012 | Lert | |
| 2012/0186942 A1 | 7/2012 | Toebes et al. | |
| 2012/0195720 A1 | 8/2012 | Sullivan et al. | |

* cited by examiner

*Primary Examiner* — Gene Crawford
*Assistant Examiner* — Kyle Logan
(74) *Attorney, Agent, or Firm* — Perman & Green, LLP

(57) ABSTRACT

An automated warehouse storage system including a multilevel storage array with storage distributed along multiple aisles. Each aisle of which has a set of storage levels and each level has storage locations distributed along the aisle. The guideway network extending through the multilevel storage array and configured for autonomous vehicles to move along the guideway network within the multilevel storage array. The guideway network including an inter-aisle guideway spanning at least two of the multiple aisles and a set of guideway levels extending in an aisle of the multiple aisles and disposed so that each guideway level is at a different one of the storage levels and the vehicles on the guideway level can access the storage locations distributed along the aisle. A ramp guideway communicably connecting each of the set of guideway levels to the inter-aisle guideway forming a common guideway path connecting the inter-aisle guideway and each guideway level so that a vehicle moving between inter-aisle guideway and each guideway level moves along the common guideway path.

9 Claims, 13 Drawing Sheets

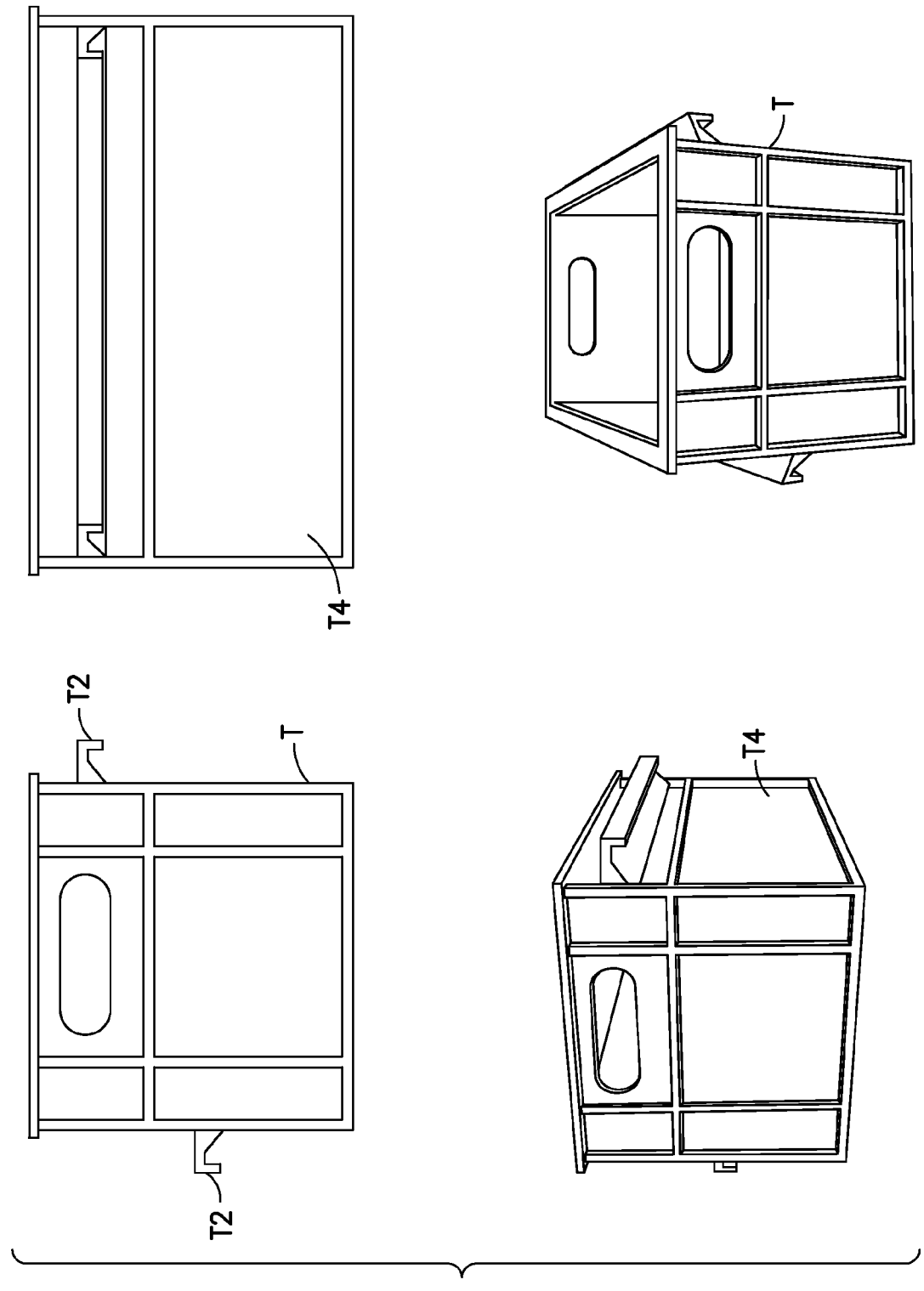

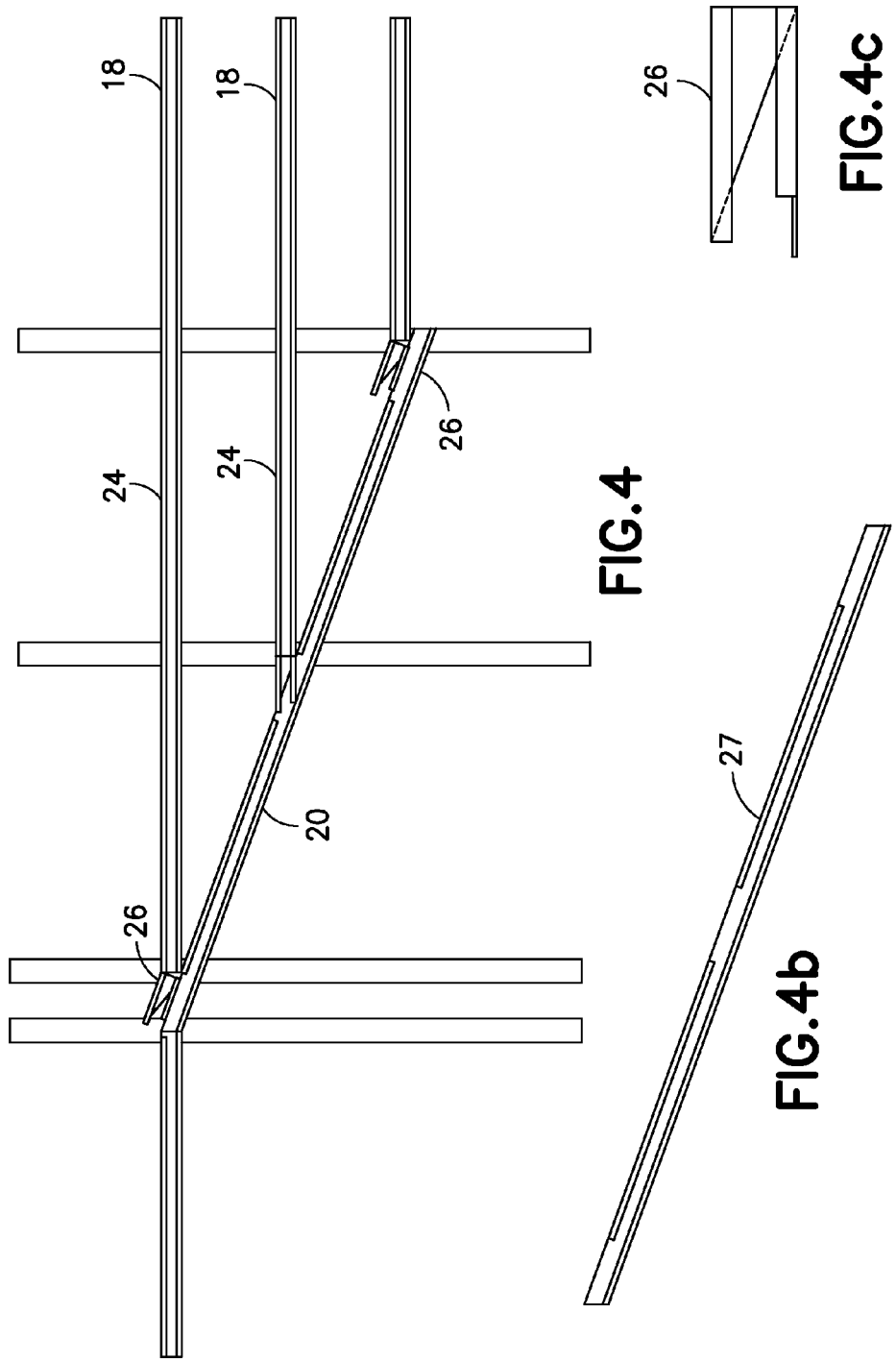

AUTOMATED SYSTEM FOR TRANSPORTING PAYLOADS

CROSS REFERENCE TO RELATED APPLICATIONS

This application is a non-provisional of and claims the benefit of U.S. provisional patent application No. 61/794,023 filed on Mar. 15, 2013, the disclosure of which is incorporated herein by reference in its entirety.

BACKGROUND

1. Field

The exemplary embodiments generally relates to an order fulfillment system for use in supply chains.

2. Brief Description of the Related Developments

An order-fulfillment system for use in supply chains, for example in retail supply chains, may fulfill orders for individual product units, referred to herein as "eaches" (also called "pieces", "articles", "items" or, generally, any articles available for purchase in retail as a purchase unit, etc.), which are typically packaged and shipped by the manufacturer in containers known as "cases". The "each" as used herein for convenience purposes, may be considered the most granular unit of handling in retail supply chains. Conventional operations to fulfill orders for eaches (usually referred to as "each-picking" or "piece-picking") are generally labor-intensive because they generally apply man-to-goods processes that are not highly automated.

The broad field of each-picking within retail supply chains can be viewed as comprising two distinct application domains: (1) store-replenishment applications, in which the orders are placed by retail stores and the picked eaches are delivered to those stores and placed on shelves to be selected and purchased by customers in the stores, and (2) direct-to-consumer applications, in which the orders are placed by end users and the picked eaches are delivered directly to those end users. In both domains, an order consists of a series of "order-lines", each order-line specifying a particular product (or "stock keeping unit" or simply "SKU") and a quantity (number of eaches) of that product to be delivered. However, there are several important differences in the operational metrics of applications within these two domains. Store-replenishment applications typically have many fewer orders than direct-to-consumer applications (as there are many fewer stores than end users), but the average number of order-lines per order is much higher for store-replenishment orders than for typical direct-to-consumer order. Also, the average number of units per order line is far greater for store-replenishment orders than for direct-to-consumer orders (because stores are buying units to sell to many customers whereas consumers are buying for their individual use). And most importantly, the total number of order lines for a given SKU (order-lines per SKU), relative to total order lines to be filled during a given time period, is much higher in the store-replenishment domain than in the direct-to-consumer domain. This is because stores typically carry very similar assortments and order more SKUs in each order, making it much more likely that a given SKU will be included in a relatively high percentage of orders, whereas consumers have diverse tastes and preferences and are ordering fewer SKUs, making it more likely that a given SKU will be contained in a relatively low percentage of orders.

These last two metrics—units per order-line and order-lines per SKU—are factors in the design an each-picking system, and the differences in these metrics between the two domains typically results in very different system designs. It is an object of the disclosed embodiment to be highly cost-efficient and effective in both domains of each-picking, but to provide design flexibility that allows the configuration to be optimized for the application based on operational metrics. As a result, in different aspects of the disclosed embodiment, the system configuration may be one optimized for each domain as will be discussed further below.

BRIEF DESCRIPTION OF THE DRAWINGS

The foregoing aspects and other features of the disclosed embodiments are explained in the following description, taken in connection with the accompanying drawings, wherein:

FIG. 1 is a drawing of a simple P-Tote, which is also suitable as an O-Tote in certain applications of the disclosed embodiment.

FIGS. 4, 4b, and 4c are a set of drawings showing the ramp and segment switches within the TSS.

DETAILED DESCRIPTION OF THE DISCLOSED EMBODIMENT

Figure 2A:
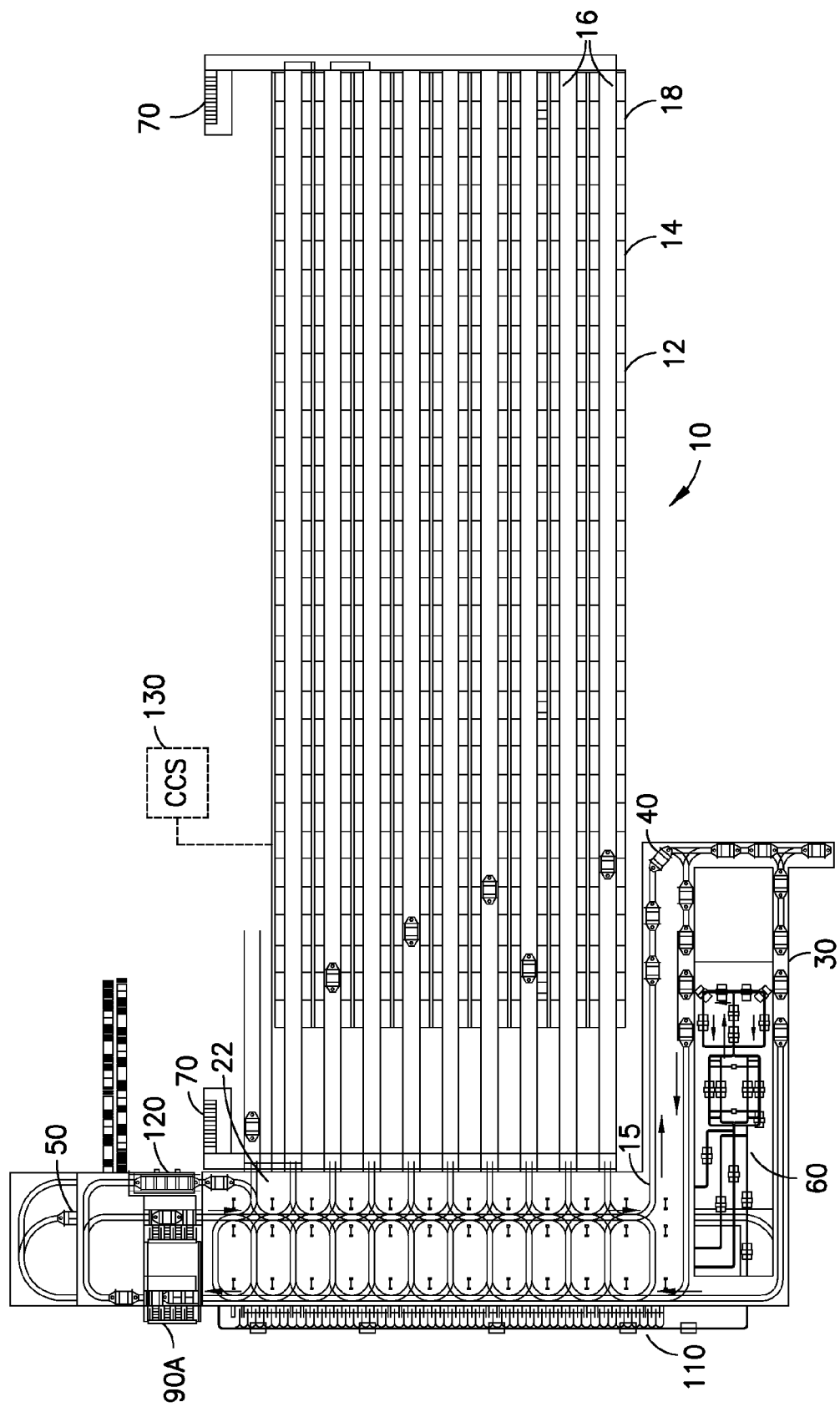
FIG. 2a is a drawing of a first aspect of the disclosed embodiment, optimized for store-replenishment applications. (Note that the compass rose is inserted as an internal directional frame of reference, without reference to true direction.)
Figure 2B:
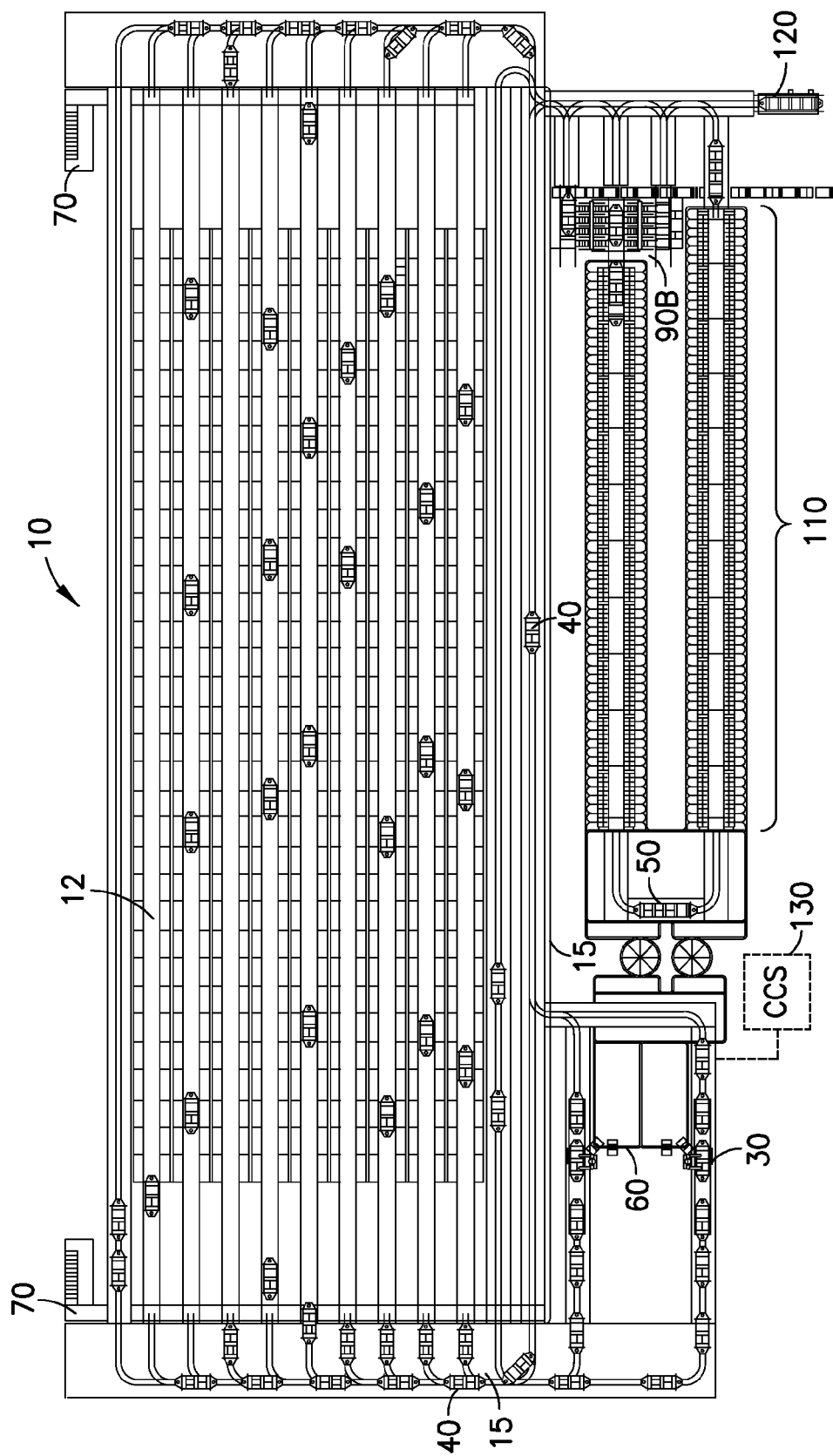
FIG. 2b is a drawing of a second aspect of the disclosed embodiment, optimized for direct-to-consumer applications. (Note that the compass rose is inserted as an internal directional frame of reference, without reference to true direction.)

Referring to FIGS. 2A-2B, there is shown schematic plan views of an exemplary order fulfillment system 10, and portions thereof for use in supply chains in accordance with the disclosed embodiments.

To achieve a very high or even total level of automation, the disclosed embodiment implements a "goods-to-man" (or "goods-to-robot") process model in which autonomous robotic vehicles bring containers of eaches to workstations where stationary pickers (either human or robotic) pick the required number of units of each SKU to fill specific order-lines. Each trip that brings one of these product containers to a workstation is referred to as a "SKU transaction."

The picked eaches are put into "order containers" for eventual delivery to customers, either stores or consumers. However, unlike most each-pick systems, in which eaches are put into the order containers immediately after being picked, the pick and put transactions in the disclosed embodiment are decoupled: picked eaches are put into intermediate carriers, specifically other robotic vehicles, which transport them to, and then put them into, the order containers. The benefits of this process model will be seen more clearly below.

(Note: the word "tote", which is a term of art commonly used in the field of materials handling to refer to a container that holds materials being stored or handled, is used hereinafter with reference to both product and order containers.)

Thus, the disclosed embodiment can be characterized as a system generally comprised of eleven elements or subsystems:

Product Totes (hereinafter referred to as "P-Totes") containing the picking stock of eaches used to fulfill orders;
Order Totes (hereinafter referred to as "O-Totes") containing the eaches picked to fulfill orders;

a Tote-Storage Structure (hereinafter referred to as the "TSS") that stores both P-Totes and O-Totes;

Robotic vehicles that store and retrieve P-Totes and O-Totes within the TSS, which have random access to all locations within a section of the TSS and are therefore called "Roam-to-Desired Destination Bots" (hereinafter referred to more simply as "R-Bots");

Picking Workstations where human or robotic pickers remove eaches from P-Totes;

Each Bots (hereinafter referred to as "E-Bots"), the robotic vehicles that receive the picked eaches and transfer them into the target O-Totes;

an Order-Loading Structure (hereinafter referred to as "OLS") that holds O-Totes for loading and provides a track network for E-Bots;

Order-handling Bots (hereinafter referred to as "O-Bots"), basically an expanded version of R-Bots, which move empty O-Totes from the Circulating Vertical Conveyor to the shelves of the OLS, and move filled O-Totes from the shelves of the OLS back to the Circulating Vertical Conveyor;

a Circulating Vertical Conveyor (hereinafter referred to as "CVC") that moves both P-Totes and O-Totes vertically between different levels of both the OLS and the TSS;

a Bot Lift that moves both R-Bots and Order-Loading Bots vertically into and out of the system (from/to ground level), and moves R-Bots between tiers;

a Central Control System (hereinafter referred to as "CCS"), consisting of software, computers, and network equipment, which manages all of the resources within the system (including all of the various robots), orchestrates the entire order-fulfillment process and all related processes, and provides status and control interfaces to human operators of the system.

These elements are described in detail below.

Generally, each of the eleven system elements or subsystems is described in detail below. Although the aspects of the disclosed embodiment will be described with reference to the drawings, it should be understood that the aspects of the disclosed embodiment can be embodied in many forms. In addition, any suitable size, shape or type of elements or materials could be used.

FIG. 1 shows several views illustrating aspects of a representative Tote T. The exemplary Tote T may serve either as a P-Tote, or O-Tote as will be described further below. The function of the P-Tote is to hold eaches that comprise the picking stock in the system available for use in filling customer orders. To simplify the design of the entire system in the various aspects of the disclosed embodiment, all P-Totes are similar size, i.e. have similar exterior dimensions. The eaches are loaded into the P-Totes outside the system by manual or automated means, so P-Totes enter the system already loaded with eaches to replenish the picking stock.

FIG. 1 is a drawing of a simple P-Tote, may be for example of a six-sided container in the shape of a rectangular solid with an open top and a single interior storage compartment. This configuration of P-Tote may be appropriate for storing eaches of a single SKU, as may in practice be typical for faster-moving SKUs. However, it is highly desirable to be able to store more than one SKU in a single P-Tote in order to maximize storage density, minimize the required number of P-Totes, and thereby enable the economical stocking of slower-moving SKUs. Towards that end, the interior volume of the P-Tote can be partitioned into multiple storage compartments either by fixed-wall partitions or by movable walls to enable each tote's configuration of storage compartments to be changed. In alternate aspects, the P-Tote is simply a frame that is a carrier of one or more variably-sized, removable sub-totes that actually hold the eaches and can easily be moved from one P-Tote frame to another (by automated means) in order to consolidate storage in as few P-Totes as possible.

Whatever the interior configuration, in the exemplary embodiment of the P-Tote, an exterior feature is the presence of "handles" T2 on each (long) side T4 of the tote. These handles may used by robots within the system in the transfer of the totes between the robot and either a rack within the TSS or a platform on the CVC, as explained in more detail below. In one aspect of the disclosed embodiment, the two handles are at different elevations along the height of the tote so that when totes are placed into storage in similar orientations, the handles on adjacent totes can overlap each other in vertical space (i.e. one above the other). This arrangement makes it possible for totes to be spaced more closely together without interference between adjacent handles, thereby maximizing storage density. The difference in elevation between the two adjacent handles may be greater than the height of the telescoping transfer arms of the R-Bot (see below) so that an arm can be extended in the space below the topmost handle without interference by the lower handle.

Note that the eaches can be loaded into the P-Totes (or sub-totes) loose, in which case the "de-trashing" process of disposing of the original shipping-container materials (e.g., cardboard, shrink wrap, etc.) may be performed immediately. Alternatively, the shipping containers could be cut open only enough to expose the contained eaches for picking and then place into the P-Tote Sub-Container with the eaches still contained inside. In this case the de-trashing process may be performed later, either at the Picking Workstations or when the P-Tote/Sub-Container returns for the next reloading/picking cycle.

The function of the O-Tote is to hold eaches that have been picked from P-Totes to fill customer orders. To simplify the design of the entire system in the aspects of the disclosed embodiment, O-Totes have similar exterior dimensions as P-Totes. It may of course be possible to design the system such that O-Totes are different in size from P-Totes, or even variably sized. O-Totes in one aspect of the disclosed embodiment also have similar two exterior handles as the P-Totes at different elevations vertically on the (long) sides for use in transfers by robots within the system. The desired interior configuration of the O-Tote depends on the application. In typical store-replenishment applications, the O-Tote simply has a single open storage compartment, just like the tote depicted in FIG. 1, and filled O-Totes also serve as the shipping containers in which the eaches are delivered by truck to the stores to be placed on the shelves for selection by customers. In typical direct-to-consumer applications, in which orders are filled at a centralized fulfillment center and shipped by truck to customers, similar tote design can be used advantageously with variably-sized sub-containers, such as cardboard boxes, that are the shipping containers in which the eaches are sent to the customers. In a different type of direct-to-consumer application, such as in an automated retail store in which customers come to the facility to pick up filled orders and take them home themselves, the O-Tote may be divided into multiple compartments by removable "liner bags", which also serve as sub-containers by which customers carry their eaches home, and which are inserted into the O-Totes by manual or automated means.

Tote-Storage Structure ("TSS"), Storage Array 12 (see FIGS. 2a, 2b)

The TSS may be a large rack system with attached guideways 15 for robots and human-access structures. It serves two functions: (1) it provides storage for totes of eaches in the system, both P-Totes containing the picking stock and filled O-Totes that are waiting to be delivered to customers, and (2) it provides a closed operating environment for the R-Bots that store and retrieve these totes and transport them between storage locations, Picking Workstations, and CVC.

The TSS may be generally comprised of five elements:

the storage rack 14, which is a multi-aisle 16, multi-level 18 rack structure that holds the totes in storage and provides the wheel-support means for R-Bots to access the rack in order to store and retrieve the totes (see also FIGS. 3a-3g);

ramps 20 that connect sets of levels together within an aisle to form zones so that R-Bots can travel to and from any storage level within a zone, the number and configuration of such zones being similar for each aisle;

interconnect 22 or inter-aisle guideways, including rail networks on which R-Bots 40 are able to travel between the aisles of the storage rack, the Picking Workstations 30, and the CVC 60;

human-access structures such as walkways, stairways, and floors that provide means for service technicians to get into and work within the TSS when necessary, such as to remove a failed R-Bot or resolve other problems; and track-control modules (not shown) that communicate with the CCS and control the position of switches within the guideway rail networks and ramp, thereby controlling the travel paths of R-Bots.

Aspects of the disclosed embodiment of the topology of the TSS may vary as desired. The first aspect of the disclosed embodiment may be designed for store-replenishment applications, which generally have a much higher ratio of eaches picked per SKU transaction, and therefore many fewer SKU transactions (i.e., R-Bot trips) for a given volume of eaches shipped, compared to direct-to-consumer applications. In this embodiment, the TSS is optimized for low cost and high space-efficiency, rather than for R-Bot throughput. The second aspect of the disclosed embodiment may be designed for direct-to-consumer applications, which have many more SKU transactions relative to the number of eaches shipped, and the TSS may therefore be optimized for R-Bot throughput, even though this configuration is somewhat more costly to build and makes somewhat less efficient use of space, compared to the first aspect of the disclosed embodiment.

FIG. 2a shows a plan view of the first aspect of the disclosed embodiment, for store-replenishment applications. In this embodiment, the TSS is said to have a "single-ended" configuration because ramps and guideways are located at only one end of the storage rack, and R-Bots travel bi-directionally both on the guideways and within the aisles. For example, on a typical round trip starting from a pick location inside the storage rack, the R-Bot picks the assigned P-Tote off the rack, travels West to and up the ramp and onto the guideway, turns South onto the guideway, travels to and through the Picking Workstation, returns to the interconnect guideway traveling North, turns into an aisle and go down the ramp to the target level, drives East down the aisle to the assigned put-away location, and finally puts the P-Tote back onto the storage rack.

FIG. 2b shows a plan view of a second aspect of the disclosed embodiment, in which the TSS is said to have a "double-ended" configuration because ramps and guideways are located at both ends of the storage rack. In this configuration, R-Bots travel in only one direction, in a circulating pattern, thereby eliminating the contention described above. For example, in the configuration shown in FIG. 2a, R-Bots travel in counter-clockwise loops, so there is an entry guideway on the East side of the storage rack on which travel is only Northbound, an exit guideway on the West side on which travel is only southbound, and two interconnect guideways to the South of the storage rack structure, one for eastbound travel and other for westbound. The eastbound guideway interconnects the exit guideway and the Picking Workstations with the CVC and entry guideway, while the westbound guideway enables R-Bots to circulate between the Picking Workstations and the CVC without having to go through the storage rack. For example, on a typical round trip starting from a pick location inside the storage rack, the R-Bot picks the assigned P-Tote off the rack, travels West to and up the ramp and onto the exit guideway, turns South onto the guideway, travels to and through the Picking Workstation, then travels on the eastbound interconnect guideway, turns North and travels on the entry guideway until reaching the target aisle, turns West and goes down the ramp to the target level, drives West along the aisle to the assigned put-away location (assuming that it is reached prior to the next pick location), and finally puts the onboard P-Tote back onto the storage rack.

Figure 3A:
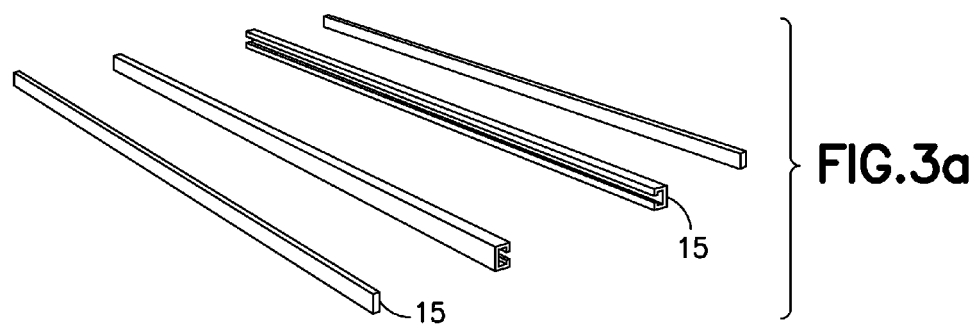
FIG. 3 is a sequence of drawings (FIG. 3a through FIG. 3g) showing the component structure of the first aspect of the disclosed embodiment of the TSS.
Figure 3B:
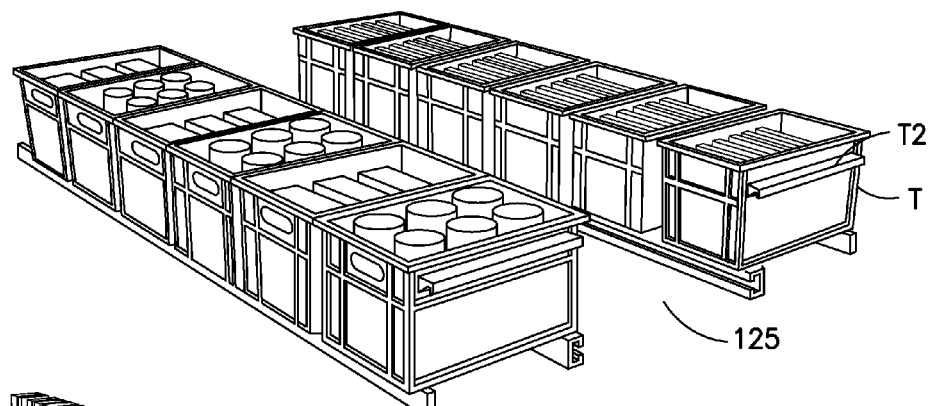
Figure 3C:
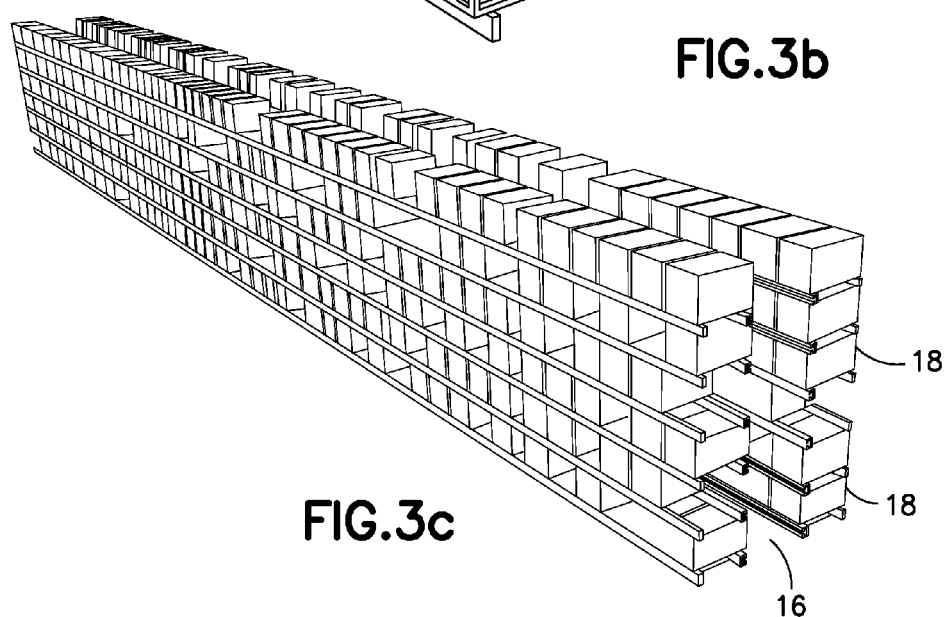

The storage rack may include steel columns that are tied together with cross-bracing to form "frames" that provide vertical support for the structure, and steel beams are attached to the frames to provide horizontal support for the objects being stored within the rack structure. Pairs of parallel beams form a rack (see FIG. 3a) that supports the totes front and rear, with the totes oriented lengthwise perpendicular to the beams (FIG. 3b). Multiple sets of beam-pairs attached to a common vertical frame create a "bay" containing multiple levels of storage. Multiple bays are constructed in a linear series, with adjacent bays sharing a common frame, to form "modules", and the modules are arranged in opposing pairs separated by spaces to create "aisles" (FIG. 3c). Since R-Bots only need access to one end of a tote to effect a transfer, back-to-back modules on adjacent aisles are abutted together, or even structurally integrated to form a single double-bay module.

"C-channel" steel shapes are used in the disclosed embodiment for the horizontal support beams 24 (see also FIG. 4). However, while the open side of the C-channel on an aisle normally faces into the bay and away from the aisle, in the various aspects of the disclosed embodiment, it faces towards the aisle. This is so that the wheels of the R-Bots can run within the inside of the "C" shape even with totes being supported by the outer top surface of the "C" shape. In other words, the C-channel beam serves both to support totes in storage and to provide a support means for R-Bots to be able to travel within the aisle. These aisle-facing C-channels are therefore referred to herein as "bot-beams".

Figure 3D:
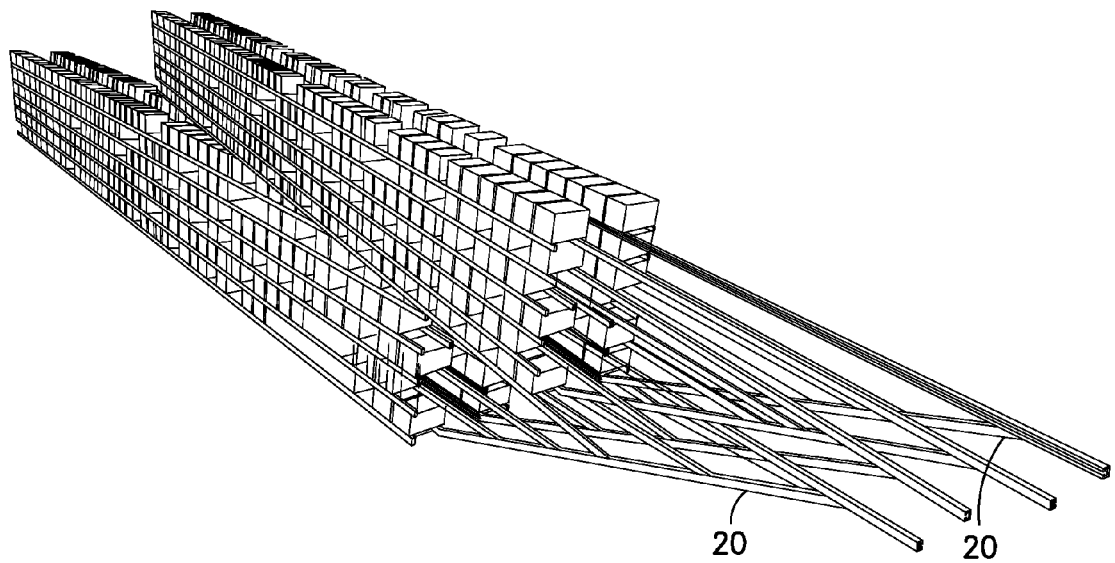
Figure 3E:
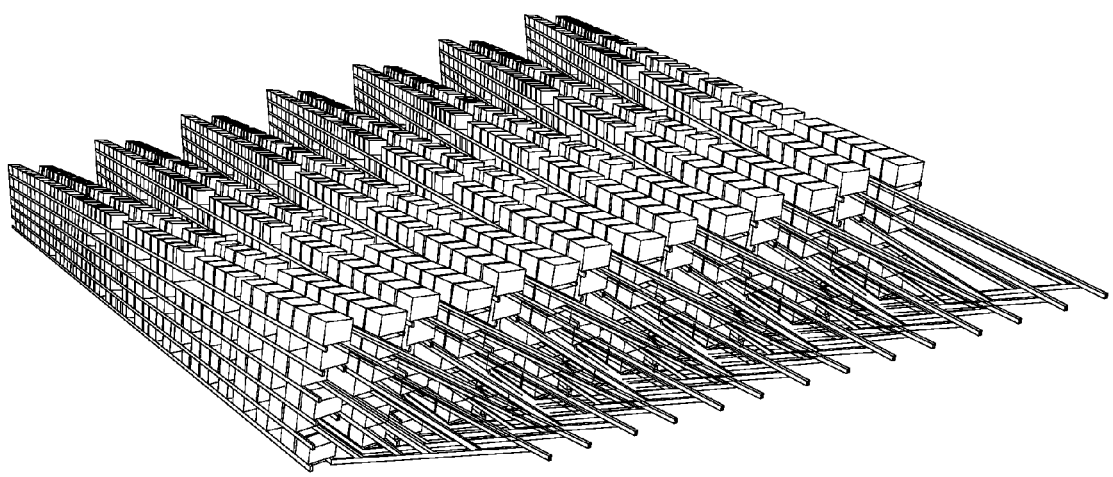
Figure 3F:
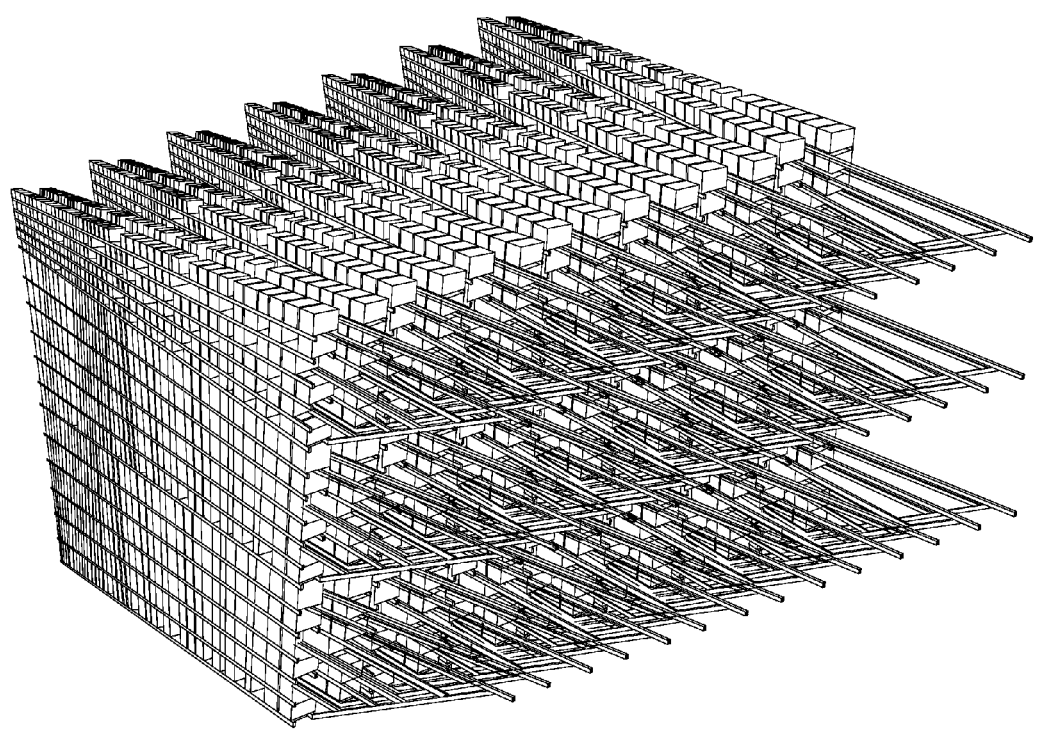
Figure 3G:
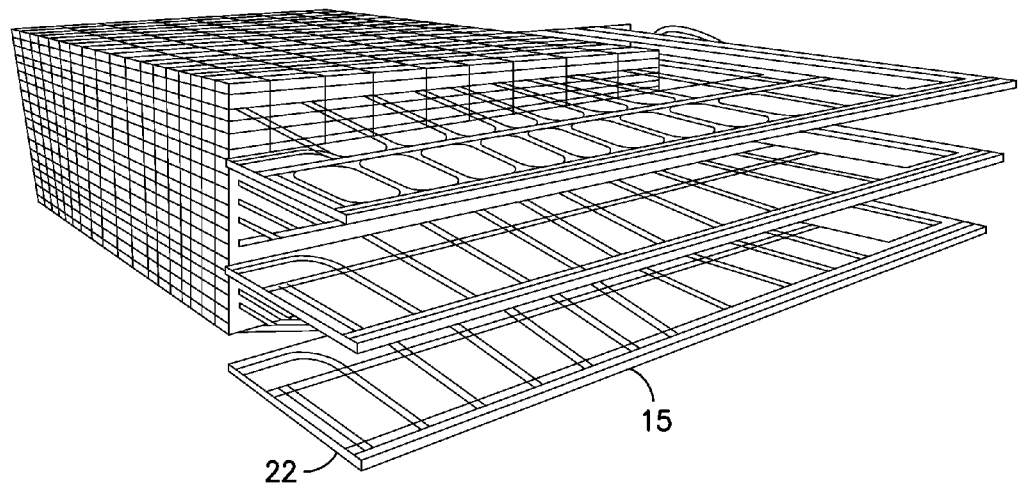

As described briefly above, at one or each end of every aisle of the TSS is a set of ramps 20, each of which is selectably connected to the bot-beams of multiple vertically-adjacent storage levels by means of a moveable "segment switch" 26 (see FIGS. 3d, 4). Each ramp and its associated segment switches enable R-Bots to enter and exit any of the attached bot-beams and thereby access any of those storage levels within that aisle.

The set of levels interconnected by a shared ramp forms a "zone" of vertical space within the aisle, and all aisles have a similar configuration of zones in terms of height. Ideally all zones within each aisle have similar height and similar number of levels, though this is not a desire. The specific number of levels to interconnect to create a zone is an application-specific design parameter that generally depends on the available clear height below the ceiling and the height of each storage level. However, there is a desire that the height of each zone may be such that a human can work comfortably and effectively within the zone as the need may arise, which may generally mean that zone heights may be a minimum of about six feet and probably a maximum of about nine feet assuming that a short stepladder can be used by technicians working in the aisles. For example, in the reference designs shown in FIG. 2a and FIG. 2b, the ceiling clear-height is about 30 feet, the height of each level is about 18". Each ramp interconnects six levels to create zones that are all about 9-feet high, with three zones stacked vertically in each aisle. Since all of the aisles have identical zone configurations, corresponding zones across all aisles can be considered to form a "tier" within the storage rack (see FIG. 3e). Thus, in the reference design illustrated in FIG. 2a and FIG. 2b, there are three tiers of nine aisles each in each system.

FIG. 4a shows one side of a ramp 20 and associated segment switches 26 for three storage levels. Each side of the ramp structure consists of a horizontal entry/exit section of standard bot-beam connected to an inclined section of modified bot-beam 27 (see FIG. 4b), the modification being the removal of portions of the top surface of the C-channel to permit the insertion of segment switches (shown in detail as FIG. 4c). In alternate aspects the configuration of switches may be reversed, such as with an upwardly inclined ramp from the common guideway. Each segment switch is actuated by an actuator to be in either a raised or lowered position, rotating on a hinge joining the top of the segment to the level's bot-beam. (In the various aspects of the disclosed embodiment, the two segment switches on a given level may be in similar position, so they are rotated by a single actuator.) When the segment switches for a given level are in the raised position (like the top and bottom switches in FIG. 4a), the wheels of an R-Bot that is moving up or down the inclined bot-beam of the ramp remain within the ramp and the R-Bot continues on its up or down path, and the wheels of an R-Bot running within the bot-beam of that level are blocked from entering the ramp. Conversely, with the segment switches for a give level in the lowered position and making contact with the bottom inside surface of the inclined bot-beam (like the middle switch in FIG. 4a), when the wheels of an R-Bot traveling down the ramp encounter the segment switches, they roll into and through the segment switches and then into the attached bot-beams of the level, and the R-Bot enters that storage level. If the R-Bot is running in the opposite direction, its wheels roll out the bot-beam of the storage rack, through the segment switches, and into the inclined bot-beams of the ramp, and the R-Bot begins climbing the ramp.

The angle of incline of the ramps is a design parameter, of course, the tradeoff factors being loss of storage rack on and near the ramps vs the ability of the R-Bots to climb the grade. The steeper the angle, the less space is lost for tote storage but the more difficult it is for R-Bots to climb, and also to descend safely. Each guideway 15 consists of a floor on which an R-Bot rail network is mounted, and its function is to enable R-Bots to move freely throughout a tier carrying totes between the storage rack 14, Picking workstations 30, and the CVC. In the first aspect of the disclosed embodiment, for store-replenishment applications, vertical space beneath each guideway is precious because the OLS occupies the vertical space between the guideways. For that reason, the guideway floors may b3 "sandwich panels", such as those formed by adhering sheets of metal on both sides of a sheet plywood (called "plymetal" panels), because this structure offers exceptional stiffness relative to its thickness. As a result, these panels can span significant distances without support beams underneath them and with minimal deflection. In the second aspect of the disclosed embodiment, by contrast, the OLS stands alone, separate from the TSS, so there is ample vertical space between interconnect guideways to construct the flooring using less costly methods that have a higher vertical profile, such as standard plywood supported by steel I-beams.

The rail network preferably provides R-Bots 40 active rail-guidance on the guideways, using standard railroad components (rails and switches), meaning that the switches determine the path of an R-Bot at every branch. These switches are controlled by the CCS, which also manages movement of the R-Bots themselves, so the R-Bots on the guideway simply drive on the rails wherever the switches take them and whenever the CCS tells them. Since railroad technology is well known, description of the details of rails and switches is not included herein. The TSS involves the bi-directional transition of an R-Bot between an aisle and a guideway, but that is best understood in conjunction with the design of the R-Bot, as described below.

It is important to note that rail-guidance of R-Bots is by no means essential to the practice of this disclosed embodiment—self-guidance by R-Bots running unconstrained on the floor may be used.

The rail-guidance is active, with switches in the rail network controlling travel path of each R-Bot, and hence a "Tow-Bot" (or "T-Bot" not shown) may be provided that can couple to an R-Bot that has failed on a guideway and pull or push it to the Bot Lift so it can be taken out of the system. The use of T-Bots may dramatically reduce the need for human intervention to resolve problems that might occur, which may in turn reduce the labor costs associated with operating a system, while also increasing system availability and reducing MTTR (Mean Time To Resolution).

Another element of the TSS is the set of access structures 70 that enable human workers to enter the TSS in order to resolve problems that might occur, such as malfunctioning R-Bots (see FIGS. 2a, 2b). For each tier, there is a walkway at both ends of the TSS (in various aspects of the disclosed embodiment), extending across all of the aisles, installed immediately below the lowest storage level in the tier. For the first tier, this walkway is of course the floor of the building, and stairs or elevators allow workers access to the walkways all of the upper tiers. In each zone, there is a walkway running the full length of the aisle and connecting to the walkway at each end, by which workers can enter the zone and reach any point on any level within the zone in order to resolve a problem. (Again, these walkways for the first tier are the floor of the building.) Since these walkways are installed below the first tier in each level, there is no interference with R-Bots running on that level. Since the wheels of R-Bots are safely captured within the "C" shape of the bot-beams, workers can walk safely on the cross-aisle walkways in front of the ramps, but as mentioned above, lock-out/tag-out mechanisms prevent workers from turning into an aisle and entering a zone until all R-Bots have been cleared and the rail switches on the relevant guideway have been positioned to prevent R-Bots from entering the zone. It should also be noted that the stairways that provide access to the cross-aisle walkways can also be configured to provide human access to the guideways.

The R-Bots 40 (see FIG. 5) are the workhorses of the system, performing the functions of (a) storing and retrieving P-Totes and O-Totes within the TSS, and (b) transporting these totes between the TSS 12, the Picking Workstations 30, and the CVC 60. As mentioned earlier, each R-Bot generally operates within a single tier, although the Bot Lift 90 (see FIG. 2a) enables them to move to different tiers as required to balance workloads. Within a tier, every R-Bot has access to any aisle (zone) and any storage level, so it can service every tote-storage position within the tier. On most trips into the TSS, an R-Bot will return at least one Product or O-Tote to storage (called a "put away"), and remove at least one Product or O-Tote from storage (called a "pick", though referring to a tote-pick rather than an each-pick). In order to minimize the amount of travel and thereby maximize productivity/throughput of each R-Bot, a put-away almost occurs on similar storage aisle/level as a pick. Stated another way, a given tote going into storage is almost assigned a storage location on similar aisle/level as the next tote to be picked, so an R-Bot can perform both a put-away and a pick on a single trip into the aisle/level.

Figure 5:
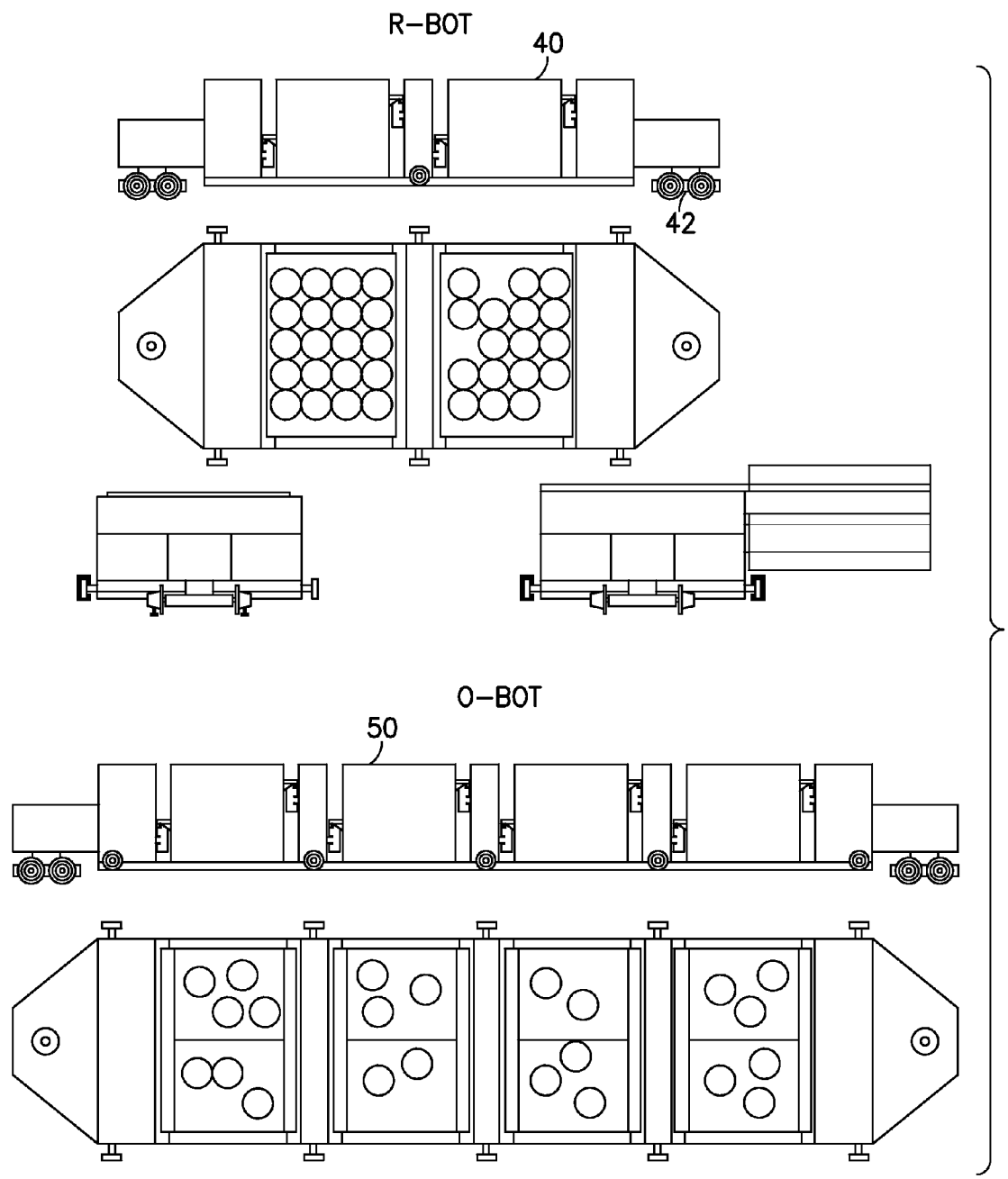
FIG. 5 is a set of drawings showing various views of the R-Bot.

FIG. 5 shows views of the R-Bot in one exemplary aspect of the disclosed embodiment. Each R-Bot is comprised of the following subsystems:

a. a chassis frame to which all of the other components are mounted;

b. at least one tote-transfer mechanism by means of which the R-Bot can transfer P-Totes and O-Totes between itself and either a storage rack within the TSS or a moving platform on the CVC;

c. a propulsion subsystem, consisting of at least one electric motor, transmission mechanisms, and drive wheels, which provides the mechanical force that moves the R-Bot;

d. an electrical-power subsystem that acquires, stores, and distributes electrical power used by the various motors, actuators, sensors, computer and other electronic components;

e. an onboard control subsystem comprising a small computer integrated with sensors and actuators that enable it to control all of the functions of the R-Bot, and integrated with a wireless network interface through which it communicates with the CCS and with other computers on the system network (e.g. WCS).

The chassis is a structural frame, typically made of steel and/or aluminum, to which all other parts of the R-Bot are attached directly or indirectly. The art in making such structures is well known and so will not be described further herein.

As shown in FIG. 5, the various aspects of the disclosed embodiment may include the R-Bot having two (or more or less) tote-transfer mechanisms. Each of the transfer mechanisms has two axes of motion: a pair of telescoping arms can be extended laterally to either side of the bot by an actuating motor, and a pair of lift mechanisms, one fore and one aft, to which each of the telescoping arms is mounted that can independently move the two arms vertically.

The R-Bot uses this mechanism to pick a P-Tote or an O-Tote from a storage location by performing the following steps: (1) extend the two telescoping transfer arms under each of the two handles of the target tote; (2) lift the two arms so that they engage the handles and lift the tote off the rack by a prescribed clearance; (3) retract the transfer arms to bring the tote onboard the bot; (4) drop the arms so that the tote is in "stowed" position (as low within the bot as possible). The procedure for transferring a stowed tote to the storage rack simply reverses the steps above: (1) lift the tote to an elevation slightly higher than the bot-beam; (2) extend arms so that the tote is now positioned over the rack; (3) drop arms so that tote rests on the storage rack and the arms are in the clear below the handles; (4) retract transfer arms.

In alternate aspects, the bot may have a single transfer mechanism. Having two or more such mechanisms improves R-Bot throughput and productivity in each of the various aspects of the disclosed embodiment of the system. In the first aspect of the disclosed embodiment, optimized for store-replenishment applications, the two mechanisms allow an R-Bot to carry two P-Totes to the Picking Workstations on each round trip. While this doesn't reduce the time spent performing storage and retrieval tasks within the TSS, the trip overhead spent traveling from the storage rack to the Picking Workstations, going through the Workstations, and returning to the storage rack is now amortized over two tote-picks instead just one, thereby improving throughput/productivity. In the second aspect of the disclosed embodiment, optimized for direct-to-consumer applications, the R-Bot carries only one P-Tote to a Workstation on each trip, but the productivity gain derives from the facts that R-Bots enter aisles at one end and exit at the opposite end and that P-Totes are returned to storage on similar aisle/level of the next pick. If an R-Bot arrives at the put-away location prior to arriving at the pick location, it can perform the two transfers with only a single transfer mechanism. However, on half of the trips, on average, the R-Bot will encounter the pick location before the put-away location, and the presence of two transfer mechanisms enables the R-Bot to execute the pick before executing the put-away. If the R-Bot had only a single transfer mechanism it may have to pass the pick location and make the put-away first in order to empty the transfer mechanism and then return back to the pick location, thereby traveling the distance between the two locations three times instead of once.

The R-Bot has a dual-drive propulsion subsystem with two separate sets of drive wheels. Two pairs of non-steerable cylindrical wheels mounted on fixed axles are used for travel within the storage rack and up and down ramps, with the wheels running within the inside of the "C" shape of bot-beams and ramp beams. The R-Bot is also equipped with four horizontally mounted, spring-loaded guide wheels that press against and run along a vertical surface of the each bot-beams, for example the vertical wall inside the "C" shape, thereby keeping the fixed wheels centered within the C-channels.

On guideways, though, the R-Bot runs on two railroad-style "steering bogeys 42", one fore and one aft, each of which has four conical wheels with flanges. The term "steering" here only refers to the fact that these wheel assemblies rotate on a vertical axis to allow the vehicle to passively follow the track, or "steer", through a turn. The active determination of route, i.e. which way a given R-Bot goes at a branch, is made by the CCS through manipulation of the switches in the track network.

One of the wheel sets may be sufficient to propel the R-Bot at any given time and a non-driving wheel set is suspended in the air where it can rotate freely, it is possible and potentially advantageous from a cost standpoint to use a single propulsion motor to drive both wheel sets simultaneously. In alternate aspects, two separate propulsion motors, one for each wheel set may be used. The two motors may share similar drive electronics.

Figure 6:
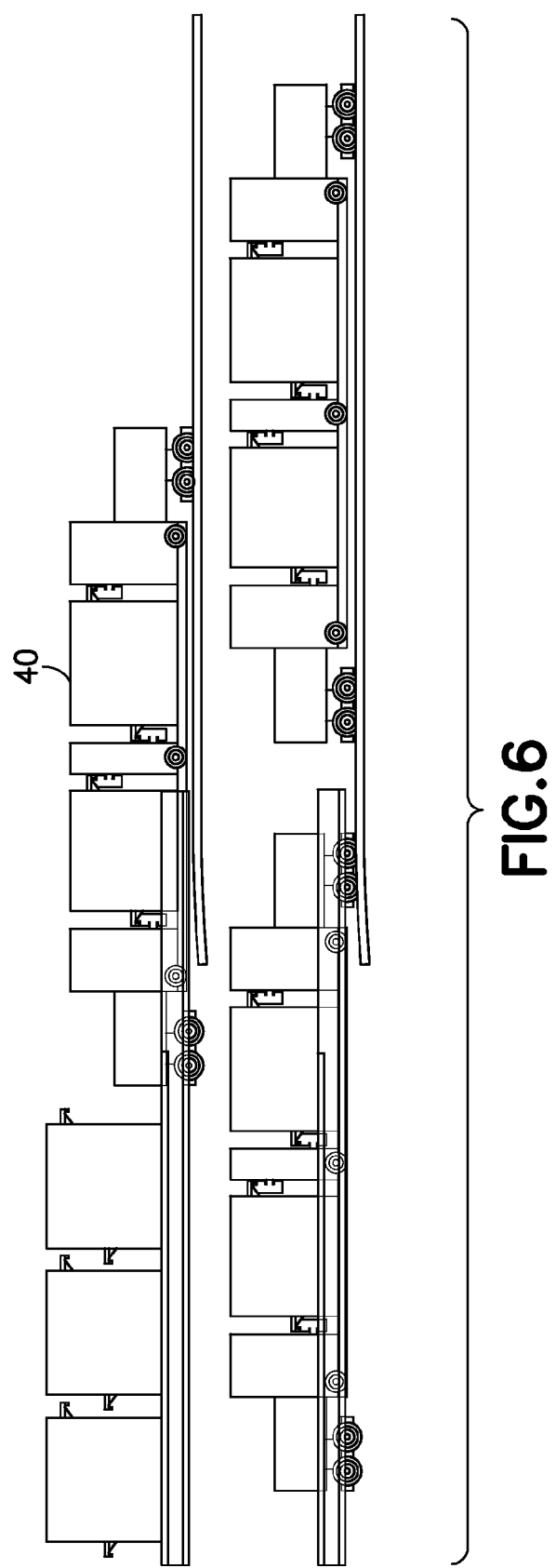
FIG. 6 is a set of drawings showing the spatial relationships between R-Bots, bot-beams, guideway rails, and the transition track section by which the R-Bot moves between aisles and guideways.

As noted above, the desire for the R-Bots to climb up the ramps is a reliability risk if the climb depends on tire adhesion through the bot drive wheels, especially if the angle of the incline is made relatively steep in order to conserve floor space. For this reason, it is desired to use supplemental drive means to propel the R-Bots up the ramps. This can be done in one of two ways. The first is to equip the R-Bot itself with such supplement drive means. For example, gear devices can be mounted on the fixed-wheel axles of the R-Bots, which engage complementary resistance features built into each ramp. In one aspect of the disclosed embodiment, this is accomplished using means very similar to the commonplace bicycle transmission, by mounting a toothed gear mounted on both sides of the driven fixed wheel axle(s) (e.g. of no greater diameter than that of the wheels at the end of the axles), and attaching a length of chain to the ramp structure alongside the length of each inclined ramp beam, in a position where the links of the chain will mesh with the teeth of the rotating toothed gears as an R-Bot begins to climb the ramp. The resistance of the chain then translates the rotational force of the axle into linear force that pulls the R-Bot up the incline. In other aspects of the disclosed embodiment, the second approach to providing supplemental drive means is to build it into the ramp structure itself, in effect to provide an external lift mechanism. For example, a motor-driven chain could be installed within the ramp structure that engages a hook or other resistance feature on the R-Bot chassis and pulls the bot up the incline without any reliance on the bot's drive motor. When an R-Bot moves in either direction between an aisle a guideway, it may makes a transition from running on the fixed cylindrical wheels within the bot-beams of the aisle to running on the steerable conical wheels on the guideway rails, or vice versa. FIG. 6 is a drawing that shows how this transition works in the various aspects of the disclosed embodiments. At each aisle entry, there is a special transitional section of rails and bot-beams that are aligned with each other, referred to herein as a "t-section". Within this section, the rails overlap the bot-beams, and the tips of the rails within the overlap (i.e., farthest from the guideway) arc downward slightly. The bot-beams of the t-section have the top surfaces cut away, so that their cross-sectional shapes are essentially a "J" rather than a "C". The rails and bot-beams of the t-section connect, respectively, to the rails on the guideway and the horizontal entry/exit bot-beam of the ramp. It may also be noted that when the R-Bot is running on the rails on the guideway, the fixed cylindrical wheels of a bot are at a slightly higher elevation than when it is running within the bot-beams connecting to the ramp. Referring again to FIG. 6, it can be seen that an R-Bot transitioning from the guideway to the aisle will be running on the conical wheels on the rail when it enters the t-section. Before those wheels reach the point where the rails arc downward, the cylindrical wheels of the R-Bot will be above the bot-beam J-channel of the t-section within the overlapping section, and when the conical wheels begin to descend down that arc, the cylindrical wheels will drop downward and encounter the J-channel. At that point, the loading on the leading wheels of the R-Bot will transfer from the conical wheels to the cylindrical wheels, and the conical wheels will be suspended in air. (When this happens, the weight of the steering bogey will activate a mechanical latching mechanism (not shown) that will keep the bogey pointing straight, i.e. in line with the bot's longitudinal axis, and prevent vibration from causing the bogey to rotate out of that alignment.) Similar load transfers will then be repeated with the trailing wheels and the transition of the R-Bot from the guideway to the aisle will be complete. When the R-Bot is transitioning in the opposite direction, from the aisle to the guideway, it will be running on the cylindrical wheels within the bot-beam of the aisle when it reaches the t-section. The conical wheels will initially be above the downward-arcing section of rail but will then encounter the rail on that arc. At that point the load will transfer from the cylindrical wheels to the conical wheels as they ride up the arcing rails, the cylindrical wheels will be lifted off the bot-beam and the leading end of the R-Bot will ride through the t-section and onto the rail network of the guideway. (The loading on the conical wheels will also release the mechanical latching mechanism so the steering bogey will be free to rotate when it reaches the turn.) Similar load transfers will then be repeated with the trailing wheels and the transition of the R-Bot from the aisle to the guideway will be complete. (It is also worth noting that the R-Bot is designed such that the cylindrical wheels are higher than the conical wheels by a sufficient distance that the cylindrical wheels clear the guideway rails without interference when the R-Bot is running on those rails.)

In the various aspects of the disclosed embodiment, the R-Bots use electricity as their energy source through a combination of "electrified rail" and stored charge. The bots acquire power through an electrified rail (which can be either conductive or inductive) installed alongside the rail networks on the guideways, and this power is used both to run on the guideways and also to recharge onboard ultracapacitors (or "ultracaps"), which then power the R-Bots when they are within the storage rack.

Figure 7:
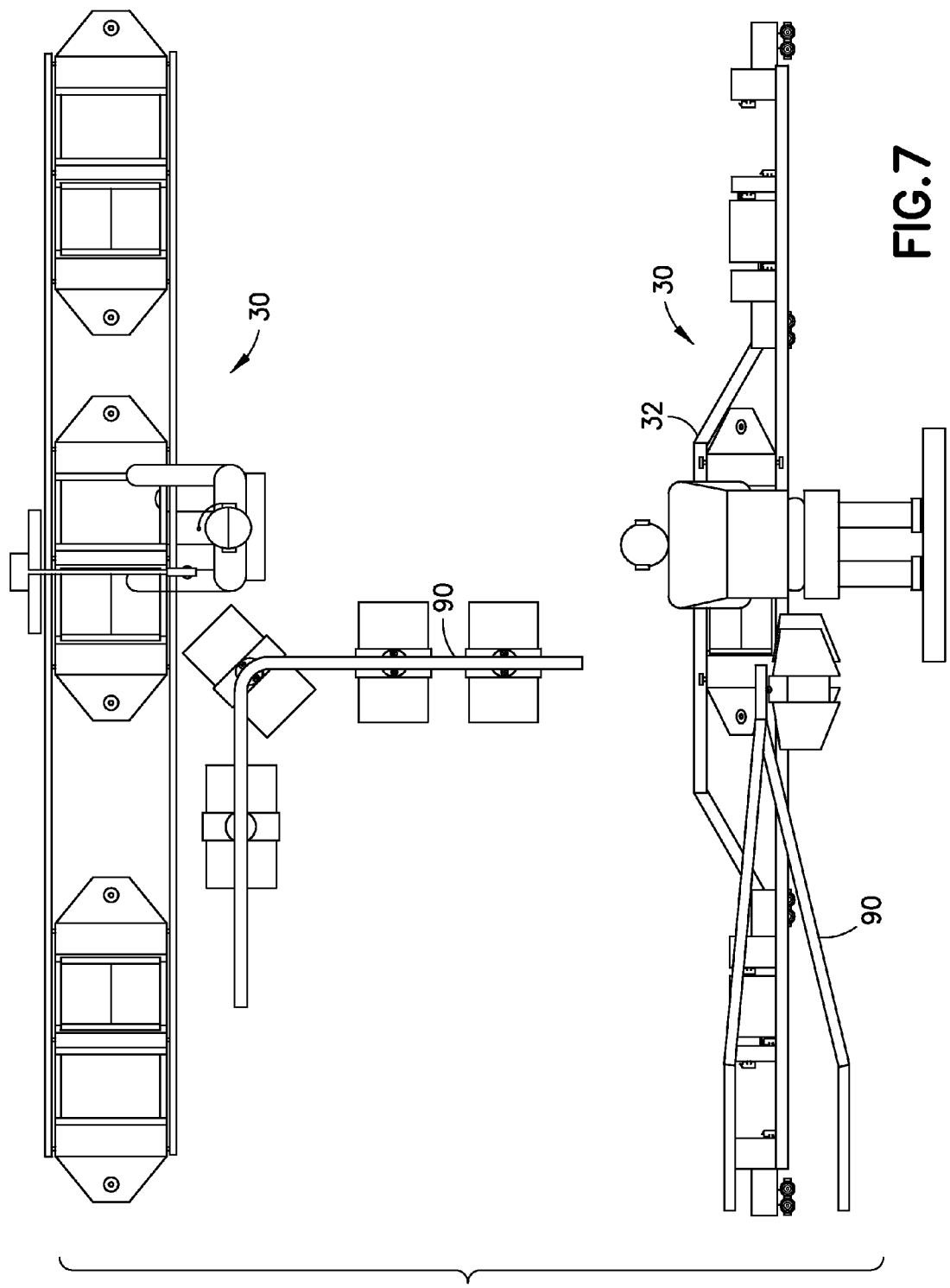
FIG. 7 shows plan and elevation views of the Picking Workstation.

Picking Workstation 30 (see FIGS. 2a, 2b, 7)

Eaches actually get picked from P-Totes at a variable number of Picking Workstations, the number of such Workstations being a function of the volume of eaches that need to be picked during peak periods. FIG. 7 shows an aspect of the disclosed embodiment of a Picking Workstation in the present disclosed embodiment using a human picker to transfer eaches between P-Totes and E-Bots. The Workstation includes:

a "tilt-track" 32 fixture on which R-Bots move into "pick position" so that the picker can remove eaches from an onboard P-Tote (with the R-Bot tilted towards the picker to make it easier for the picker to reach into the P-Tote);

a chair fixture that supports the human picker in an ergonomically advantageous posture; and an E-Bot track section 90 on which E-Bots move into "put position" so that the picker can put eaches into their load-carriers.

The role of the picker is simply to remove eaches from presented P-Totes and place them into E-Bot load-carriers. If eaches are still contained within partially-opened shipping cases inside the P-Totes, a secondary function of the picker is to de-trash by removing the remainder of these shipping cases once they are empty and disposing of it. This can be managed simply by equipping the Workstation with trash chutes that direct this waste material either into a collection container at ground level or a conveyor that carries the material to a container or compactor located elsewhere in the facility.

The operation of the Workstation is managed by a Workstation Control Computer ("WCS"), which is a subsystem within the CCS. The WCS interacts with the human picker by means of several additional items of equipment:

a display screen which displays the number of eaches remaining to be removed from the P-Tote;

a headset by which the operator can receive information from the WCS through voice synthesis and input information to the WCS through voice recognition;

a machine vision subsystem that includes a camera mounted at an elevated position with a field of view that includes both the R-Bot pick-position and the E-Bot in put-position, by which it monitors the movements of the operator's hands (note: white (or visual contrast) gloves can be worn by operators to make this task faster and more reliable);

weight-sensors that can measure changes in the weight of both the E-Bot and R-Bot in order to verify/validate the transfer of the correct numbers of eaches specified by the order lines being fulfilled.

When an R-Bot or E-Bot enters a queue at a Workstation, as directed by bot-management software within the CCS, it establishes a communications link with the WCS and its movements are then managed by the WCS until its transfers have been completed. The operation of the workstation generally consists of the following actions for example, all effectively controlled by the WCS, starting with an R-Bot loaded with a P-Tote in pick-position and an E-Bot in put-position with a load-carrier presented for receiving eaches:

The picker's screen displays the number of eaches remaining to be picked from the P-Tote and the WCS sends a synthesized-voice input to the picker of that number through the earphones on the picker's headset.

The picker reaches into the P-Tote with one or both hands and removes one or more of the target eaches, voicing input to the WCS indicating the number of eaches being transferred, and puts those eaches into the load-carrier on the E-Bot.

By reading the output of the weight sensors detecting the weights of the R-Bot and E-Bot, the WCS measures the weight reduction in the R-Bot and the weight increase in the E-Bot when a transfer is made. One obvious verification check is to compare two weight changes to ensure they are essentially equal in magnitude (within the measurement accuracy of the sensors). Moreover, by dividing the absolute value of this weight change by the known unit weight of the target SKU's eaches (read from a database), the WCS can determine the number of eaches just transferred (again within the measurement capability of the sensing technology), so the system is not solely dependent on the voice input of pick quantity by the human picker and can thereby detect an "overpick", i.e. the removal of more eaches than have been ordered. Any discrepancy in the results of these validations may generate an error message and exception-handling logic on the part of the WCS. Otherwise, the eaches are considered successfully transferred and the WCS subtracts this number of eaches from the number of remaining eaches prior to the pick to yield an updated number of units remaining to be picked.

By tracking the picker's hand movements via the vision subsystem, the WCS can literally "see" the transfer process being performed by the picker. As soon as the picker's hands have moved away from the P-Tote after removing the last of the remaining eaches to be picked from that P-Tote, the WCS commands the R-Bot to move forward slightly and present the next onboard P-Tote, if there is one; or if there is no other onboard P-Tote from which to pick, the WCS simultaneously commands the R-Bot to leave the Workstation (passing control of that R-Bot back to the CCS bot-management software), and the next R-Bot in the queue to move forward into pick-position. (An exception to this process occurs if the picker is also required to de-trash. In this case, the picker may execute a voice input after picking the last each from the partially opened shipping case, indicating to the WCS that a de-trashing move is required. This input causes the entire process to pause so that the waste material can be removed from the P-Tote and disposed of by the picker, and after this de-trashing move, the picker can issue a second voice command causing the picking process to resume.)

The WCS uses similar methods to manage the movements of the E-Bots. When the weight sensor shows that eaches have been dropped into an E-Bot's presented load-carrier and the vision system sees the picker's hands move away from the E-Bot, the WCS commands the E-Bot to rotate its load-carrier mechanism and present the next empty load-carrier, if there is one; or if all the load-carriers on the E-Bot are full, the WCS simultaneously commands the E-Bot to move out of put-position (passing control of that E-Bot back to the CCS bot-management software) and the next E-Bot in the queue to move forward into put-position and present the first empty load-carrier.

One design feature of the pick/put transfer process described above is that the picking rate is essentially determined by the picker's hand movements as detected by the machine-vision system, because they are used by the WCS to trigger the actions of the R-Bots and E-Bots. As a result, the picker is controlling the flow of materials at the Workstation at a rate comfortable to him/her, without any conscious thought or explicit action—if the picker speeds up his/her rate of picking, the bots move faster through the Workstation, and vice versa. That being said, there are a number of element of the Workstation's design whose purpose is to enable maximization of the picker's pick-rate, including for example the following:

The donating P-Tote is in proximity to the receiving E-Bot load-carrier, so the picker is moves the eaches a minimal distance—only a few inches—in order to effect the transfer, thereby minimizing transaction times and operator fatigue.

As mentioned earlier, the tilt-track fixture causes the R-Bot—and therefore the presented P-Tote—to be rotated slightly towards the picker, making it considerably easier for the picker to reach into the tote and grasp eaches, which also reduces both transaction times and operator fatigue.

The elevation of the P-Tote is also above the E-Bot load-carrier, so the transfer is "downhill", i.e. gravity-assisted, to further minimize operator fatigue.

This is a goods-to-man process model and there is a single fixed location for both the pick and the put, thus there is zero travel time for the picker, who can therefore remain in a stationary position all the time. This very effectively maximizes throughput. The operator is provided a chair-like fixture specifically designed to provide desired support to the body and minimize fatigue, such as the "kneelsit" chair (see http://www.kneelsit.com for suitable example) The realized fatigue and repetitive stresses, which in turn can degrade throughput and, more importantly, can be potentially injurious to the picker. The operator is also able to rotate the chair so he/she can pick with either hand, and so can switch hands to deal with fatigue and repetitive use, and also can use both hands simultaneously to pick heavier objects or multiple eaches in a single pick.

Finally, 1 bot moves may occur simultaneously with the picker's moves, and this overlapping of tasks in time minimizes the time a picker may wait for bot moves. For example, while the picker is reaching hands into a P-Tote to pick eaches, the receiving E-Bot is rotating load-carriers or moving into put position to replace the previous E-Bot, so by the time the picker has completed the pick and is ready to put the each(es) into an E-Bot load-carrier, the appropriate load-carrier is ready to receive it. Conversely, while the picker is executing the move to put one or more picked eaches into the receiving E-Bot load-carrier, the donating R-Bot can be shifting forward to present the next P-Tote or moving into pick position to replace the previous R-Bot, so by the time the picker has completed the put and is ready to make the next pick, the appropriate P-Tote is in position to be picked from.

In the alternate aspects an automated picker may be used with a robotic arm in place of the human picker. This may have a machine-vision system that can determine the locations and orientation of target eaches to pick within the unstructured visual field of loose eaches within the P-Tote, and (b) an end-of-arm effector that can reliably grasp these target eaches and execute the transfer, notwithstanding the very broad range of sizes, shapes, packaging materials, crushability, and other attributes of the eaches across the full assortment of SKUs being handled. With a robotic picker, moreover, the Workstation may no longer include the user-interface components described above, including display screen, headset, and chair, nor may it need the weight sensors in order to validate the correct pick quantity.

In the various aspects of the disclosed embodiment described herein, the P-Totes are carried through the Workstations onboard an R-Bot, as this is the simplest, "leanest" process model. However, in some applications with a high average number of eaches per SKU transaction—such as store-replenishment applications R-Bot throughput/productivity could be improved if the incoming P-Tote were instead transferred by the R-Bots to a conveyor, carried through the Workstations by the conveyor, and then picked up by other R-Bots for the return to storage. In this way, each R-Bot may simply unload its P-Tote(s) on a conveyor, move to another location to pick a different P-Tote(s) off the conveyor to either return to storage or if empty to the CVC for removal from the system. If the total time required for the R-Bot to complete both of these two transfers is less than the average time required to carry the P-Totes through the Workstation, the average R-Bot round-trip transaction time may be reduced, R-Bot productivity may increase, and fewer R-Bots may be required for a given volume of SKU transactions. E-Bots (see FIG. 9)

E-Bots 100 serve as intermediate carriers of eaches from the pickers to the O-Totes. In materials-handling systems 17 is desired to minimize the number of transfers of handled items. Most prior art each-pick systems, even those that employ a goods-to-man process model, adhere to that rule by having picked eaches placed directly into the receiving order container immediately after being removed from the product container. However, this "direct-put" method requires both containers to be in similar places at similar times in order to effect the transfer, and this constraint (a) adds software and algorithmic complexity, and (b) significantly limits productivity/throughput because it restricts the number of order lines for a given SKU that can be filled on each SKU transaction. This is especially true in large-scale goods-to-man each-pick systems.

Maximizing the number of order-lines per SKU transaction ("OL/ST") minimizes the number of SKU transactions (and therefore R-Bot trips) to fill a given volume of order lines, so OL/ST is a metric in optimizing the productivity of any order-fulfillment system (especially store-replenishment applications). Virtually all direct-put systems therefore have algorithms for increasing OL/ST by scheduling orders to be filled concurrently that share order lines for similar SKUs. Whatever the specifics of any such algorithm, its effectiveness in maximizing OL/ST is ultimately a function of the number of orders that can physically be in-process (or "active") at the time of each SKU transaction. In a direct-put, goods-to-man process, the maximum number of active orders is a function of workstation design and configuration, limited by the number of order containers that are arrayed at the workstations for filling. The problem is that increasing the number of active orders past a certain relatively low threshold degrades picker productivity/throughput for a variety of reasons, so workstations designs inevitably may compromise either picker productivity or automation efficiency (OL/ST) or both, and in a manual system a considerably higher priority is usually placed on picker productivity.

However, this conflict between optimization goals can be completely eliminated by relaxing the constraint of the direct-put method and allowing an additional transfer of the picked eaches into an intermediate carrier that transports them from the Picking Workstation and puts them into the target O-Tote. In the disclosed embodiment, the E-Bot 100 is that intermediate carrier, and its use provides two operational and system-design capabilities:

Because every E-Bot can access every O-Tote, every Picking Workstation can fill any order-line from any active order, so on every SKU transaction it can fill all order lines for that SKU from all active orders (limited only by the number of eaches in the specific P-Tote presented for picking).

Because of the decoupling of the pick from the put, the number of concurrently-open orders is not a function of workstation design and so can be scaled to an arbitrarily large number totally independently of the number, size, or configuration of workstations. This means that OL/ST can be optimized without any impact whatsoever on picker productivity.

Figure 8:
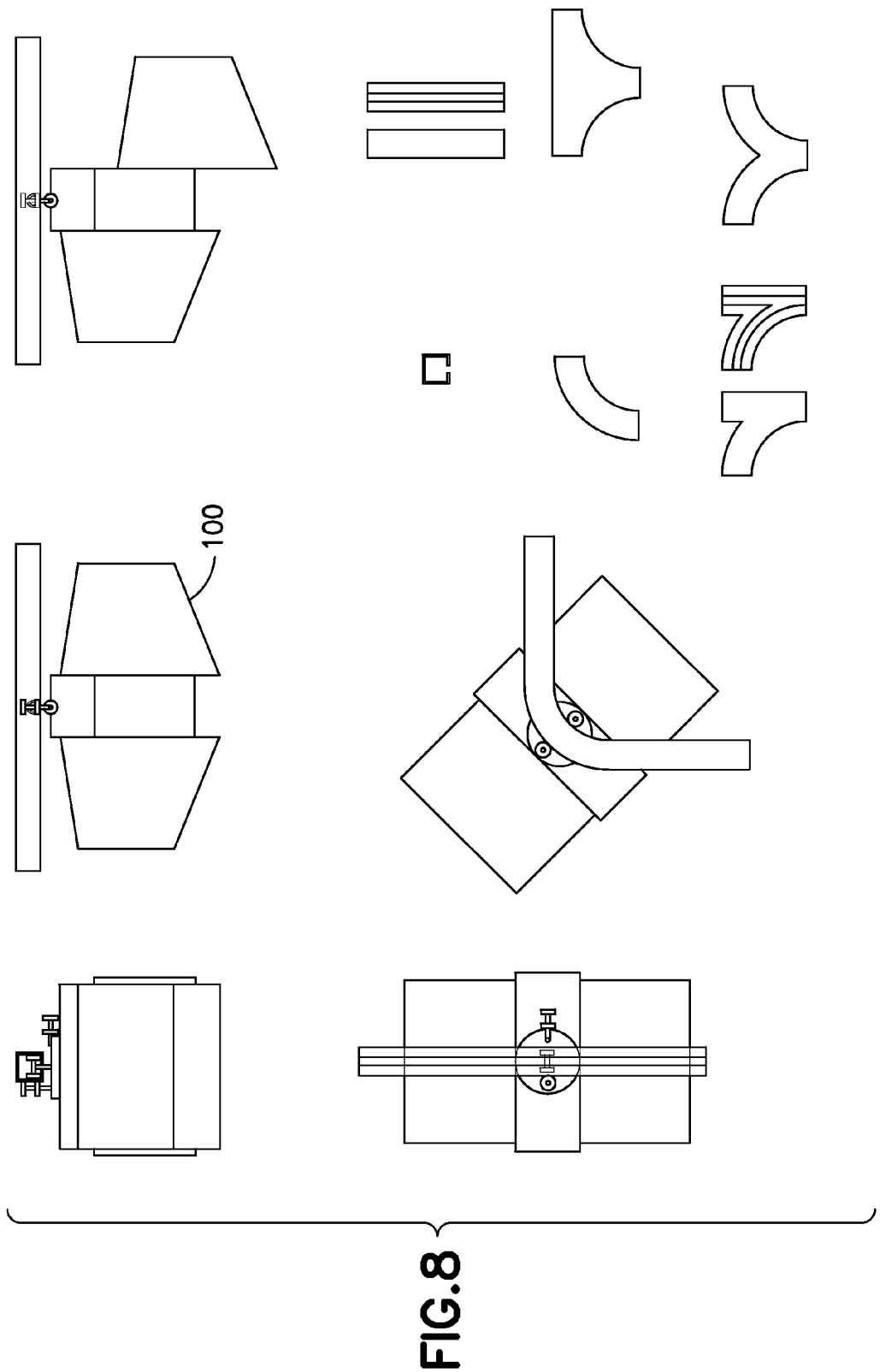
FIG. 8 is a set of drawings showing the design of the Each-Bot and the overhead track shapes within which it operates.

As shown in the drawing in FIG. 8 of an aspect of the disclosed embodiment, the E-Bot 100 operates suspended from on an overhead track structure. It consists for example of the following general components:

a drive assembly located at the top of the Bot;

a main body attached to the bottom of the drive assembly;

an array of at least one and if desired multiple load-carriers attached to the main body, each such carrier holding for transport eaches from a single order line;

at least one drop-down transfer mechanism for depositing eaches into O-Totes through a gravity-assisted transfer (in one aspect of the disclosed embodiment, the load-carriers also perform this function);

a power subsystem, including conductive or inductive pick-ups for acquiring power from an external power source, and an internal ultracap for storing power, and a control subsystem consisting of an onboard computer and other electronic circuit boards, and an array of sensors.

The drive assembly includes a main drive motor that turns a vertical drive shaft that extends upwards and drives an axle to which two drive wheels are mounted that run within the overhead track structure. Except at branches and merges, the cross-sectional shape of the track is an "open" rectangle, i.e. there is a gap in the bottom plane of the rectangle, which creates a "slot" in the bottom of the track. The two drive wheels run on the horizontal surface on each side of the slot, with the drive-shaft housing extending through the slot, and the drive-assembly housing and attached main body suspended below. (Note that since the E-Bot runs on two wheels, it will hang in a vertical position below the track even if the track is sloped at an angle off horizontal.) In the various aspects of the disclosed embodiment, straight sections of the track are fabricated very simply by cold-rolling sheet metal. More complicated sections of the track, such as curves, branches, and merges (also shown in FIG. 8) are fabricated as cast parts.

The drive assembly also includes two non-driven guide wheels, one on each side of the drive shaft, each of which is mounted to the unattached end of a shaft that is pivotably attached at the other end to the drive-assembly base such that it can be rotated between a vertical ("UP") position and an off-vertical or horizontal ("DOWN") position. When a shaft is UP, the attached guide wheel is pressed against the outside vertical surface of the track, the point of contact being in-line with the center-axle of the drive wheel assembly inside the track. When the guide-wheel shaft is in the DOWN position, the attached guide wheel is below the bottom of the track so that it can pass under the track without interference. With both of the shafts in the UP position (and under tension), the guide wheels keep the drive wheels running straight in-line within the interior of the track, i.e. they prevent the drive wheels from veering off-line and either scraping against the interior vertical walls or dropping into the center slot of the track. With one shaft in the UP position and the other in the DOWN position, the guide wheels enable the E-Bot to travel through a branch or merge in the track, as explained more fully below.

A variety of track sections are shown in FIG. 8 that, depending on the direction of E-Bot travel, allow either a single line of track to branch into two, or two lines of track to merge into one, thereby providing maximum flexibility in designing E-Bot travel paths within a system. These branch/merge sections include shapes resembling generally the letters "L", "Y", and "T" any similar shapes may be used. As can readily be seen, an E-Bot cannot pass through one of these sections with both of the guide-wheels shafts in the UP position without encountering an interference with one of the two branching or merging tracks, and so one of the two shafts may be rotated into the DOWN position prior to reaching the branch/merge section of track. In a merge there is only one choice of which guide-wheel shaft to drop, i.e. the one that may otherwise encounter the interference with the other merging track. However, in a branch either of the two guide-wheel shafts can be dropped DOWN, and in effect it is the selection of which guide wheel is dropped to DOWN and which remains UP that determines the track that the E-Bot selected at the branch. When a single track branches into two, each of the two vertical sidewalls of the single incoming track is shared by one of the two outgoing tracks, and when an E-Bot enters the branch on the single incoming track, it will take the outgoing track that shares the vertical sidewall along which the UP guide wheel is running. The E-Bot is therefore able to control its path through a branch, i.e. "steer" itself, simply by dropping the guide wheel on the side not connected to the desired outgoing track.

Whenever a E-Bot travels through any branch/merge track segment, one of its drive wheels may pass over the slot of the branching or merging track. The guide wheel that may cross this chasm is on the side with the DOWN guide wheel, and the guide wheel that remains in the UP position performs a critical role in preventing that drive wheel from dropping into the slot in the track. At the point where the drive wheel reaches the slot and there is no longer a horizontal support surface underneath the wheel, gravity will try to pull the unsupported wheel into the slot, thereby creating a rotational force on the E-Bot in that direction. However, the UP guide wheel resists this rotational force by pressing against the outer wall of the track, and the load originally carried by the drive wheel in question transfers to the UP guide wheel until the drive wheel passes over the slot and reengages with the roadway surface of branched or merged track. (A slight downward lip on each side of the slot helps to smooth the transition of the guide wheel when it leaves the first roadway surface and when it returns to the roadway surface on the other side of the slot.)

According to the drawing in FIG. 8, each of the two load-carriers on an E-Bot receives one or more eaches from the picker at the Workstation, holds them as the E-Bot travels to and positions itself over the destination O-Tote, then is lowered into the O-Tote, and finally releases the picked eaches so they are pulled down into the O-Tote by the force of gravity. Thus, in this embodiment, each load-carrier generally carries all of the eaches for a single order line being filled, so an E-Bot can fill two order lines on each round trip. As can be readily understood, however, increasing the number of order-lines that can be filled on each trip will increase the productivity and throughput of the E-Bots. In the present design, this may be accomplished by increasing the number of load-carriers: depending on the size of the largest each to be handled, there might be three or even four, and it may also be possible to create more complex designs to increase the order-line-per-trip capacity of the E-Bot even further.

In FIG. 8, the load-carriers are mounted on the main body such that they can be rotated. This rotation is used to position the empty load carriers to receive eaches sequentially at the Workstation, and again at the destination O-Tote to position the appropriate load-carrier above the target O-Tote (or sub-tote therein) so it can drop down and release the load of eaches. In the drawing in FIG. 8, the load-carrier is shown simply as a rigid container with a bottom surface that can slide open to release the contained eaches, but the design of the load-carriers may be varied based on maximum size of the desired load and the accuracy and precision desired of the drop/release procedure. Like their larger R-Bot cousins, E-Bots are electrically powered through a combination of stored power via onboard ultracaps and electrified rail (either conductive or inductive), which may be most logically installed in the track at the workstations so the bots could be charging as they wait in queue and in "put-position" to receive eaches.

Figure 9:
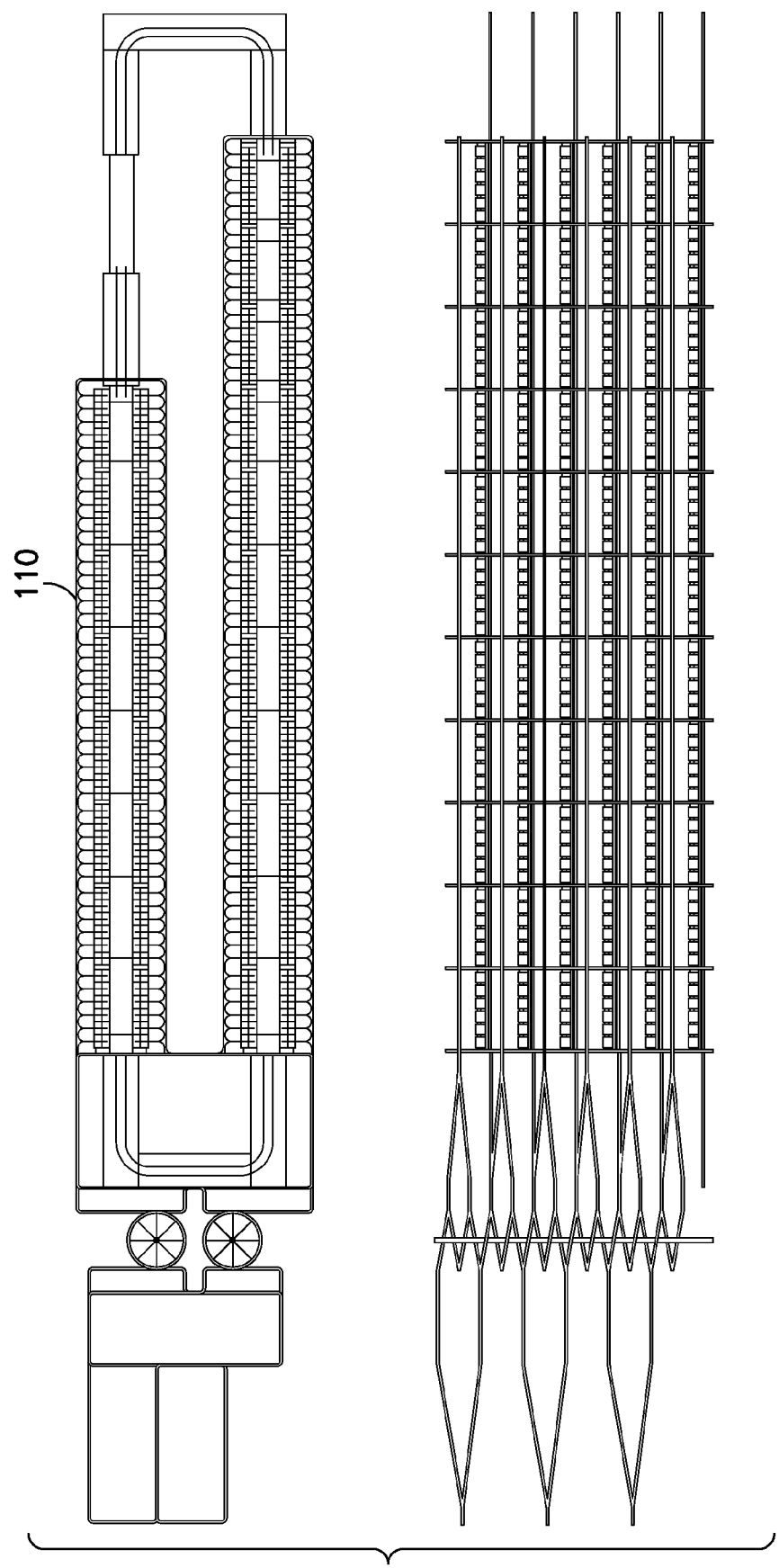
FIG. 9 shows plan and side elevation views of the Order Loading Structure.

Order-Loading Structure ("OLS") 110 (see FIG. 9)

FIG. 9 shows the Order-Loading Structure 110, which includes a rack structure for temporary storage of O-Totes, and also the E-Bot track network. (The stand-alone OLS configuration shown in FIG. 9 corresponds to the second aspect of the disclosed embodiment, optimized for direct-to-consumer applications and shown in FIG. 2b. The OLS configuration for the first aspect of the disclosed embodiment, optimized for store-replenishment applications, shown in FIG. 2a, is functionally equivalent, though it differs in certain features as a result of being integrated within the interconnect deck region of the TSS.)

The rack structure for temporary storage of O-Totes resembles the rack structure of TSS in many respects. It consists of two parallel pairs of rack modules, each with multiple storage levels, each pair being separated by a space to create two aisles within which operate a fleet of robotic vehicles ("O-Bots") that handle the totes. As in the TSS, bot-beams on the aisles serve both to support the totes in storage and provide a running surface for the wheels of the O-Bots. The two parallel aisles have loading levels at similar elevations, and the multiple loading levels are connected between the two modules at both ends by end-turn guideways. These guideways, which are comparable in both form and function to their counterparts in the TSS, allow the O-Bots to come out of one aisle, turn a half-circle on the guideway rails, and enter the adjacent aisle. (The CVC is positioned at one end of the OLS, the end farthest from the Picking Workstations, and in-line with one or both of the aisles.)

Each loading level of the OLS includes both the four pairs of beams (two pairs in each of the two aisles) that support the O-Totes, plus E-Bot track that enable E-Bots to drive to a position directly over any of the O-Totes on that level. As shown in FIG. 9, the configuration of the E-Bot track on every loading level includes a line of track running around the perimeters on both sides of each rack module, and at each O-Tote position on the loading rack the perimeter line is connected by a "T"-shaped track section to a short spur centered over the O-Tote. Optional cut-through segments advantageously enable E-Bots to minimize the length of the route that may be travelled on each trip. To put an each into a given O-Tote, an E-Bot travels around the perimeter track until it reaches the target tote, branches onto the spur above that tote, positions itself and drops the eaches into the tote, and then merges back onto the perimeter line and either proceeds to another target tote or, if empty, returns to one of the Picking Workstations to be reloaded.

The E-Bot track network may include means by which E-Bots can move vertically to any of the various elevations at which the multiple loading levels and multiple workstations are located. In one aspect of the disclosed embodiment shown in FIG. 9, this elevation-changing means is a pair of track structures shaped as helixes, one by which E-Bots can go up and the other down. These helixes are positioned between the loading rack and the Workstations, enabling E-Bots to enter and exit the helixes from either side as they move back and forth between the rack structure and the Workstations. Since an E-Bot climbing the UP helix will consume much more power than when running anywhere else within the E-Bot track network, it will likely be advantageous to embed the electrified rail within this track structure in order to reduce the amount of power that may otherwise have to be stored within the ultracaps of the entire fleet of E-Bots. Each helix also has an opening at ground level by which E-Bots can enter into the system (via the UP helix) or exit the system (via the DOWN helix).

At the Workstations, there is a single line of track servicing each pair of Workstations, where E-Bots queue up for both pickers, and a "Y"-shaped branch at the end of this line where the bots go to one picker or the other. As mentioned earlier, electrified rail may be installed in all of the track at the Workstations, so E-Bots will be able to recharge their ultracaps during this portion of each trip.

The free-standing configuration OLS configuration can be scaled in length largely independently of the TSS, and so can be made arbitrarily large subject to other constraints (e.g. facility limitations).

O-Bots 50 (see FIG. 5)

O-Bots 50 perform the function of moving O-Totes in and out of the OLS, i.e. they receive empty O-Totes being inducted into the system via the CVC 90, place them on the rack to be filled, take them off the rack when filled, and put them back on the CVC to be either discharged from the system or moved into storage within the TSS by R-Bots. There is at least one O-Bot per loading level of the OLS, and this number can be increased as needed to handle the number of O-Totes being moved in and out of storage. O-Bots simply travel substantially continuously around the oval formed by the two storage aisles and end-turn guideways, stopping only to transfer O-Totes onto and off of both the storage racks and the CVC platforms.

The O-Bot is simply an elongated version of an R-Bot (see FIG. 5), with the extra length used for additional transfer mechanisms to increase the bot's productivity/throughput. For example, while an R-Bot will typically be equipped with two transfer mechanisms, the O-Bot might typically have four.

Figure 10:
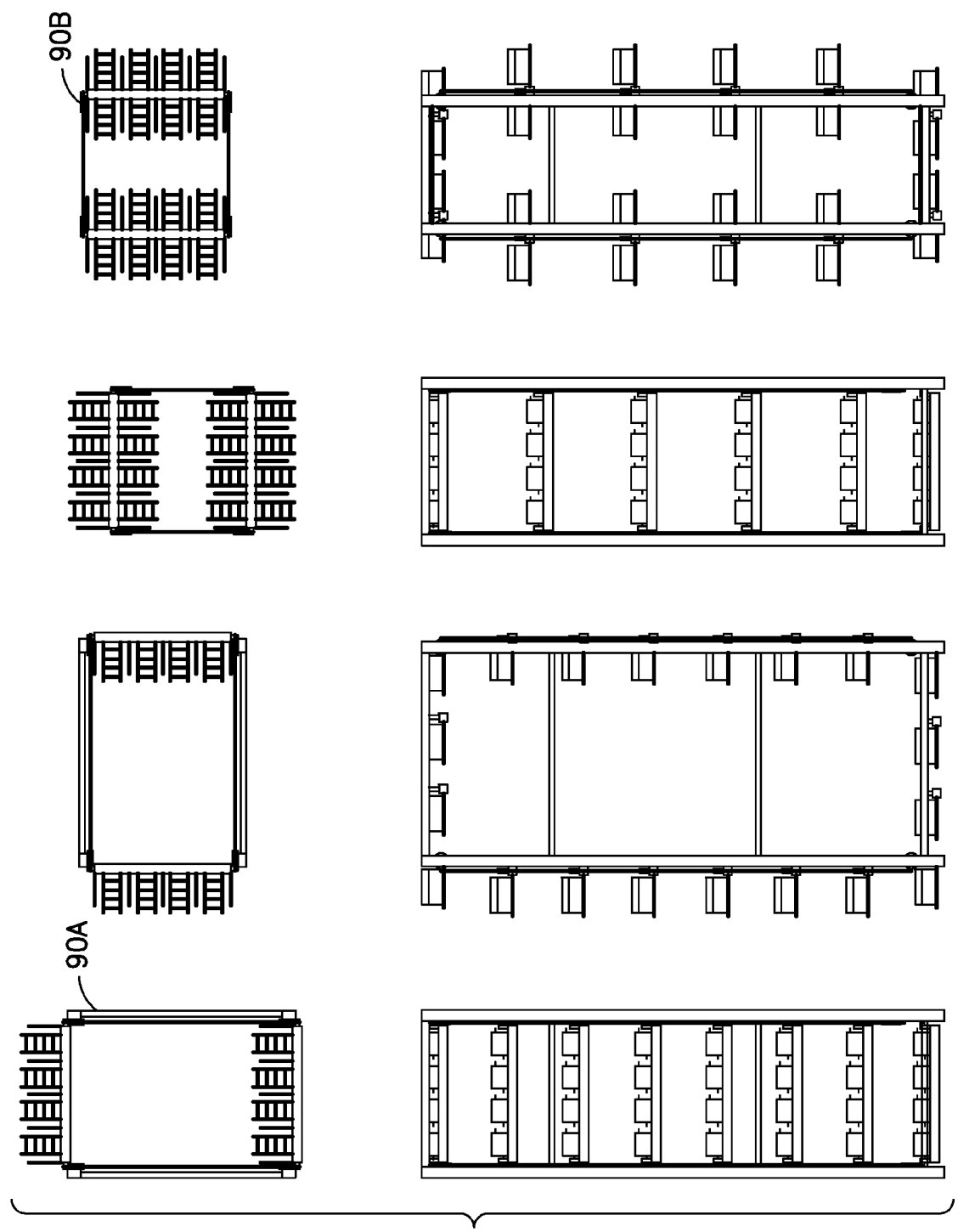
FIG. 10 shows plan and elevation views of both configurations of the Circular Vertical Conveyor.

Circulating Vertical Conveyor ("CVC") 90 (see FIG. 10)

The CVC 90 moves P-Totes and O-Totes vertically as desired to support the order-fulfillment process performed by the system. This includes for example the following general kinds of moves:

moving filled P-Totes from an inbound conveyor to R-Bots to be placed into storage within the TSS, thereby replenish the picking stock of eaches;

moving empty O-Totes from an inbound conveyor to O-Bots to be placed into the OLS and filled with picked eaches;

moving empty (depleted) P-Totes from R-Bots to an outbound conveyor to be discharged from the system, typically to be refilled with fresh picking stock and then returned back into storage for another cycle of depletion;

moving filled O-Totes from R-Bots and O-Bots to an outbound conveyor for delivery to customers;

moving filled O-Totes from O-Bots to R-Bots to be placed into temporary storage within the TSS, pending eventual discharge for delivery to customers;

moving filled O-Totes from R-Bots to O-Bots for additional filling, for example as a result of customers adding items to their orders; and moving P-Totes between R-Bots on different tiers, to be either picked from or returned to storage, e.g. in order to balance workloads that may otherwise be imbalanced, for example as a result of non-uniform staffing of Picking Workstations.

Shown in FIG. 10, the CVC 90 is a paternoster lift, a suitable example of which are those manufactured by NERAK Systems (see http://www.nerak-systems.com/circulating-conveyor.htm). It consists for example of a number of load-carrying platforms attached to a pair of closed belts or chains that are rotated continuously in a rectangle-shaped loop, forming two "columns" of platforms moving in opposite directions vertically. The platforms are loaded and unloaded while moving, i.e. without stopping. Platforms are loaded while moving upward and unloaded while moving downward, and the loading/unloading can take place at any point on the vertical path in either direction.

Two configurations of the CVC 90A, 90B are shown in FIG. 10. Both carry multiple loads (totes) per platform cycle, but the first is "single-sided" 90A in which each platform has only one row of load positions (four in the drawing), while the second configuration is "double-sided" 90B in which each platform has two rows of load positions. (In this configuration, load positions that face towards the outside of the CVC at any given moment of time are "outer platforms" and those that face towards the inside are "inner platforms".) The double-sided configuration 90B enables transfers in both directions (outbound and inbound) from a single location in the center of the CVC. This capability results from the fact that the outer load positions on platforms moving in one direction become the inner load positions when the platforms transitions to moving in the opposite direction, and vice versa. Thus, an R-Bot or O-Bot in the center of the CVC can offload outbound totes onto the inner load positions of rising platforms, which can then be unloaded from outside the CVC when the platforms are descending. Then, from similar locations in the center of the CVC, the bot can on-load totes from the inner load positions of descending platforms, which had been loaded from outside the CVC (onto the outer load positions) when the platforms were moving up. Because the bot does not have to make a move between the two transfers, as with the single-sided CVC configuration, this advantage of bi-directional transfer from the center of the CVC also results in somewhat higher bot productivity by comparison.

The first aspect of the disclosed embodiment shown in FIG. 2a uses the single-sided configuration of the CVC, 90A with platforms rotating in a clockwise direction when facing North, i.e. platforms on the left side of the drawing are ascending and those on the right side are descending. The R-Bot and O-Bot travel may be clockwise (if looking down), i.e. Northward on the left-most rail or aisle and South on the rightmost rail or aisle. Bots thus enter the offloading transfer location going North, transfer their outgoing totes onto an ascending CVC platform, travel around the 180° turn, enter the on-loading transfer location going South, and unload totes from a descending platform. The single-sided CVC is most cost-efficient for store-replenishment applications because the volume of O-Totes is relatively small for a given volume of eaches picked, so the benefit of higher throughput of the double-sided CVC does not justify the higher cost.

The second aspect of the disclosed embodiment, optimized for direct-to-consumer applications and shown in FIG. 2b, uses the double-sided CVC 90B configuration, primarily because of its throughput advantage given the much higher volume of O-Totes relative to the volume of eaches picked. O-Bots execute all of their transfers from the center of the CVC, while R-Bots use both center and outside transfer locations.

In both aspects of the CVC, stationary transfer mechanisms interface to input and output conveyors in order to bring totes into and take totes out of the system. (In the double-sided configuration, these fixed conveyor transfers load and unload the outside-facing load positions; only bots load and unload the center-facing positions.) These transfer mechanism can simply be stationary versions of the transfer mechanisms on the R-Bots and O-Bots.

It should be noted that in both aspects of the disclosed embodiments, R-Bots and O-Bots load and unload CVC platforms directly. The bots hold the totes by means of the side handles, while the CVC platforms support the totes from the bottom, so the transfers are effected when the bots extend their transfer arms into the path of the moving CVC platforms—either holding a tote to be transferred to an empty ascending platform, or empty to receive a tote from a loaded descending platform. While this is the "leanest" process model, with the minimum number of transfers and transfer mechanisms, there may be significant benefits associated with using intermediate transfers—i.e. the bots may transfer to and from fixed transfer mechanisms that may then load and unload the CVC. The four most important of these benefits may include (a) improving productivity and throughput of the bots since they mayn't have to wait for target platforms, (b) improving the reliability of these transfers by eliminating use of the side-handles and having all totes handled from the bottom during loading & unloading of the CVC, (c) improving storage efficiency within the TSS somewhat by reducing the width of tote handles (or eliminating them altogether), and (d) reducing the cost and improving the reliability of R-Bots and O-Bots by eliminating the design desire that their transfer mechanisms may withstand the moment loads generated when they receive totes moving down on CVC platforms.

Bot Lift 120 (see FIGS. 2a, 2b)

The Bot Lift 120 is a reciprocating lift adapted to carry both R-Bots and O-Bots, primarily through the installation of a pair of bot-beams within its load-carrying cab. Bots enter/exit the lift from/to a guideway in similar ways they enter/exit aisles, and ride up and down on the lift with the four cylindrical wheels captured within the C-channels of the bot-beams.

Central Control System ("CCS") 130 (see FIGS. 2a, 2b)

The CCS 130 subsystem manages the overall operation of the system. It consists of application software running on one or more "server" computers and communicating via wired and wireless network interfaces with all of the other active subsystems (R-Bots, E-Bots, TSS switch-controllers, Workstations, O-Bots, CVC controller, Bot Lift, etc.). Though complex to develop, the application software runs on standard operating systems and uses standard software platforms, languages, database engines, network communications protocols, development tools, etc., all well known in the art. The following are among the tasks performed by the CCS and its programming for example:

Managing the induction of O-Totes to replenish the available picking stock within the TSS, which includes determining the storage location for these totes (which will be based at least partially on an optimization goal of balancing the overall demand for SKU transactions across tiers, i.e. so that all the tiers will over time will have roughly equal numbers of SKU transactions).

Selecting orders to be filled, which can be based on scheduled shipping times and various optimization goals, such as maximizing the OL/ST performance metric.

Based on the order-lines to be filled among the selected orders, scheduling SKU transactions.

Assigning R-Bots to bring the specified P-Totes out of storage and carry them to/through the Picking Workstations, and then to return them to storage or, if empty to load them onto the CVC. As explained above, each P-Tote returned to storage will be assigned a new storage location on similar storage aisle/levels where the R-Bot's next pick is stored.

Controlling the movement of all the R-Bots within the system, including controlling the positions of switches within the rail networks on the guideways and the segment switches within the ramps so that the bots are able to reach their destinations while avoiding collisions with other bots.

Controlling the Operation of the Workstations (via the WCC Subsystem).

Controlling the movement of E-Bots, including travel to their target O-Totes, the deposit of the picked eaches into those O-Totes, and their return to the Workstation for a next cycle. This task includes a traffic-control function to prevent collisions of the moving E-Bots.

Controlling the activities of the O-Bot, assigning them the tasks of picking filled O-Totes from the storage racks of the OLS, placing empty (or partially filled) O-Tote on the storage racks, loading and unloading those totes to/from CVC platforms, and controlling all their movements. If there are multiple O-Bots on the OLS loading levels, this latter task also includes a traffic-control function to prevent bot collisions.

Monitoring the operation of the CVC, and managing the assignment of loads to load positions on the platforms, which then drives the timing of the loading and unloading tasks executed by R-Bots, O-Bots, and fixed transfers at the input/output conveyor interfaces.

Interfacing with external systems to manage the induction of replenishment P-Totes and empty O-Totes, and the discharge from the system of filled O-Totes and empty P-Totes.

Managing the movement of filled O-Totes into storage within the TSS and then out of storage for delivery to the customer.

Handling exceptions—dealing with problems that occur when something goes wrong, such as a hardware failure in any of the subsystems, including the safe entry of human technicians into the system as required to resolve such problems.

Providing status and operational information, and a control interface, to human supervisory technicians.

In another aspect of the disclosed embodiment, one additional capability of the disclosed embodiment may be implemented in a software process. While the primary purpose of the system is order-fulfillment, the use of E-Bots and OLS makes possible a simple, highly automated process for handling returned merchandise, often called "reverse logistics", which can is labor-intensive in many prior-art automated each-pick designs. After going through physical inspection and SKU-identification, returned eaches that are qualified to be placed back into picking stock are loaded into empty P-Totes, one each per tote or sub-tote. (Totes containing the returned eaches are referred to as "R-Totes".) When the system is ready to process a set of returned eaches, all of the P-Totes in the TSS that contain SKUs associated with the returned eaches are brought out of storage, but instead of being taken by an R-Bot to the Picking Workstations as usual, they are unloaded by an O-Bot and placed onto a loading rack in the OLS. Once all of these P-Totes have been staged within the OLS, the R-Totes holding the returned eaches are inducted into the system via the CVC, and taken to Picking Workstations by R-Bots. There, the pickers remove all of the eaches in every R-Tote, putting them singly into E-Bot load-carriers, i.e. one each per load-carrier. The E-Bots then travel to and put the eaches into their respective P-Totes in the OLS, thereby completing their return to picking stock.

In accordance with one or more aspects of the disclosed embodiment, an automated warehouse storage system is provided. The automated warehouse storage system having a multilevel storage array with storage distributed along multiple aisles, each aisle of which has a set of storage levels and each level has storage locations distributed along the aisle, a guideway network extending through the multilevel storage array and configured for autonomous vehicles to move along the guideway network within the multilevel storage array, the guideway network including an inter-aisle guideway spanning at least two of the multiple aisles and a set of guideway levels extending in an aisle of the multiple aisles and disposed so that each guideway level is at a different one of the storage levels and the vehicles on the guideway level can access the storage locations distributed along the aisle, and a ramp guideway communicably connecting each of the set of guideway levels to the inter-aisle guideway forming a common guideway path connecting the inter-aisle guideway and each guideway level so that a vehicle moving between inter-aisle guideway and each guideway level moves along the common guideway path.

In accordance with another aspect of the disclosed embodiment, at least one of the guideway levels is selectably connected to the ramp guideway, and the system comprise a controller configured to effect selection between a connected and disconnected state.

In accordance with another aspect of the disclosed embodiment, the system comprises a switch between the at least one of the guideway levels and the ramp guideway.

In accordance with another aspect of the disclosed embodiment, a vehicle moving on each guideway level moves along the aisle to storage locations In accordance with one or more aspects of the disclosed embodiment, an automated warehouse storage system is provided. The automated warehouse storage system having a first storage array, that is a multilevel array, with storage distributed along multiple aisles, each aisle of which has a set of storage levels and each level has first storage locations distributed along the aisle for first containers (the contents of which are a common retail item), first autonomous vehicles, each configured to transport a first container, a first guideway network extending through the multilevel first storage array and configured for the first vehicles to move along the first guideway network to the first storage locations within the multilevel first storage array, the first guideway network including a common guideway common to more than one of the multiple aisles, and guideway levels arranged so that each aisle of the multiple aisles has a set of guideway levels disposed so that each guideway level is at a different one of the storage levels and the first vehicles on the guideway level can access the storage locations distributed along the aisle, a second storage array with arrayed second storage locations for second containers, second autonomous vehicle, and a second guideway for the second vehicles to move along the second guideway to the second storage locations in the second storage array, and a picking station connected to the common guideway for first vehicles to transport first storage containers from the first storage locations to the picking station, and connected to the second guideway for second vehicles to move from the picking station to the second storage locations, the picking station connecting the common guideway to the second guideway and being configured so that contents of the first containers are transferred from the first containers to the second vehicles. The second guideway is configured so that each of the second vehicles, when loaded at the picking station, moves from the picking station along the second guideway to one of the second storage locations, accesses an interior of the second container in the second storage location and transfers the contents from the second vehicle to the second container.

In accordance with another aspect of the disclosed embodiment, the second autonomous vehicles independent of the first vehicle.

In accordance with another aspect of the disclosed embodiment, the picking station is configured so that each retail unit content from the first containers is transferred from the first containers to the second vehicles in substantially one step.

In accordance with another aspect of the disclosed embodiment, wherein the first containers are inbound or product containers, and the second containers are outbound or order containers.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated warehouse storage system comprising;
   a multilevel storage array with storage distributed along multiple aisles, each aisle of which has a set of storage levels and each level has storage locations distributed along the aisle;
   a guideway network extending through the multilevel storage array and configured for autonomous vehicles to move along the guideway network within the multilevel storage array;
   the guideway network including an inter-aisle guideway spanning at least two of the multiple aisles and a set of guideway levels extending in an aisle of the multiple aisles and disposed so that each guideway level is at a different one of the storage levels and the vehicles on the guideway level can access the storage locations distributed along the aisle; and
   a ramp guideway communicably connecting each of the set of guideway levels to the inter-aisle guideway forming a common ramp guideway path connecting the inter-aisle guideway and each guideway level so that a vehicle moving between inter-aisle guideway and each guideway level moves along the common ramp guideway path.

2. The system of claim 1, wherein at least one of the guideway levels is selectably connected to the ramp guideway, and the system comprise a controller configured to effect selection between a connected and disconnected state.

3. The system of claim 1, further comprising a switch between the at least one of the guideway levels and the ramp guideway.

4. The system of claim 1, further comprising a vehicle moving on each guideway level that moves along the aisle to storage locations.

5. An automated warehouse storage system comprising:
- a multilevel storage array with storage distributed along multiple aisles, each aisle of which has a set of storage levels and each level has storage locations distributed along the aisle;
- a guideway network extending through the multilevel storage array and configured for autonomous vehicles to move along the guideway network within the multilevel storage array;
- the guideway network including an inter-aisle guideway spanning at least two of the multiple aisles and a set of guideway levels extending in an aisle of the multiple aisles and disposed so that each guideway level is at a different one of the storage levels and the vehicles on the guideway level can access the storage locations distributed along the aisle; and
- a ramp guideway disposed within the aisle, a ramp portion of the ramp guideway being in communication, at one end, with one guideway level of the set of guideway levels and at an opposite end with another set of guideway levels at a different guideway level.

6. The system of claim 5, wherein the ramp guideway communicably connects each of the set of guideway levels to the inter-aisle guideway forming a common ramp guideway path connecting the inter-aisle guideway and each guideway level so that a vehicle moving between inter-aisle guideway and each guideway level moves along the common ramp guideway path.

7. The system of claim 5, wherein at least one of the guideway levels is selectably connected to the ramp guideway, and the system comprise a controller configured to effect selection between a connected and disconnected state.

8. The system of claim 5, further comprising a switch between the at least one of the guideway levels and the ramp guideway.

9. The system of claim 5, further comprising a vehicle moving on each guideway level that moves along the aisle to storage locations.

* * * * *